United States Patent
Oba et al.

(10) Patent No.: US 8,231,491 B2
(45) Date of Patent: Jul. 31, 2012

(54) POWER OUTPUT APPARATUS AND HYBRID VEHICLE

(75) Inventors: Hidehiro Oba, Aichi-ken (JP); Hiroshi Katsuta, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 742 days.

(21) Appl. No.: 12/440,162

(22) PCT Filed: Aug. 30, 2007

(86) PCT No.: PCT/JP2007/066908
§ 371 (c)(1),
(2), (4) Date: Mar. 5, 2009

(87) PCT Pub. No.: WO2008/029708
PCT Pub. Date: Mar. 13, 2008

(65) Prior Publication Data
US 2010/0006357 A1    Jan. 14, 2010

(30) Foreign Application Priority Data
Sep. 6, 2006 (JP) .................................. 2006-241932

(51) Int. Cl.
*F16H 3/72* (2006.01)
(52) U.S. Cl. ......................................... 475/5; 180/65.25
(58) Field of Classification Search ........ 475/5; 74/325, 74/661; 180/65.7, 65.225, 65.285, 65.21, 180/65.25
See application file for complete search history.

(56) References Cited

U.S. PATENT DOCUMENTS

| 5,558,588 | A | | 9/1996 | Schmidt |
| 5,669,842 | A | * | 9/1997 | Schmidt ............................. 475/5 |
| 5,730,676 | A | * | 3/1998 | Schmidt ............................. 475/5 |
| 5,935,035 | A | * | 8/1999 | Schmidt ............................. 475/5 |
| 6,427,549 | B1 | * | 8/2002 | Bowen ............................ 74/331 |
| 6,551,208 | B1 | * | 4/2003 | Holmes et al. .................... 475/5 |
| 6,634,986 | B2 | * | 10/2003 | Kima ............................ 477/107 |
| 6,808,470 | B2 | * | 10/2004 | Boll .................................. 477/6 |
| 6,837,215 | B2 | * | 1/2005 | Nishigaki et al. ............. 123/352 |
| 7,108,087 | B2 | * | 9/2006 | Imai .......................... 180/65.23 |
| 7,128,675 | B2 | | 10/2006 | Klemen et al. |

(Continued)

FOREIGN PATENT DOCUMENTS

EP        2 058 160 A1    5/2009
(Continued)

OTHER PUBLICATIONS

Extended EP Search Report of EP 07 806 385 dated Mar. 15, 2011.

*Primary Examiner* — J. Allen Shriver, II
*Assistant Examiner* — Brodie Follman
(74) *Attorney, Agent, or Firm* — Kenyon & Kenyon LLP

(57) ABSTRACT

A hybrid vehicle includes an engine, motors configured to input and output power, a power distribution integration mechanism, and a transmission. The power distribution integration mechanism has a sun gear connected with one of the motors, a carrier connected with the other motor, and a ring gear connected with the engine. The transmission includes a first speed change mechanism and a second speed change mechanism. The first speed change mechanism has a first speed gear train and a third speed gear train arranged to connect the carrier of the power distribution integration mechanism with a driveshaft. The second speed change mechanism has a parallel shaft-type gear train that is not used alone to set the speed ratio.

7 Claims, 14 Drawing Sheets

U.S. PATENT DOCUMENTS

| | | | |
|---|---|---|---|
| 7,223,200 B2* | 5/2007 | Kojima et al. | 477/3 |
| 7,317,259 B2* | 1/2008 | Yamauchi | 290/40 C |
| 7,356,398 B2* | 4/2008 | Steinmetz et al. | 701/55 |
| 7,448,981 B2* | 11/2008 | Mashiki | 477/3 |
| 7,479,081 B2* | 1/2009 | Holmes | 475/5 |
| 7,559,864 B2* | 7/2009 | Maeda et al. | 475/5 |
| 7,562,730 B2* | 7/2009 | Shimizu et al. | 180/65.23 |
| 7,572,201 B2* | 8/2009 | Supina et al. | 475/5 |
| 7,575,078 B2* | 8/2009 | Muta et al. | 180/65.265 |
| 7,575,079 B2* | 8/2009 | Minamikawa | 180/65.285 |
| 7,575,529 B2* | 8/2009 | Holmes | 475/5 |
| 7,645,206 B2* | 1/2010 | Holmes et al. | 475/5 |
| 7,658,248 B2* | 2/2010 | Kaya et al. | 180/65.265 |
| 7,695,387 B2* | 4/2010 | Oba | 475/5 |
| 7,806,795 B2* | 10/2010 | Oba et al. | 475/5 |
| 7,931,102 B2* | 4/2011 | Katsuta et al. | 180/65.225 |
| 7,938,208 B2* | 5/2011 | Oba et al. | 180/65.265 |
| 8,000,866 B2* | 8/2011 | Heap et al. | 701/54 |
| 8,021,256 B2* | 9/2011 | Conlon et al. | 475/5 |
| 8,047,314 B2* | 11/2011 | Oba et al. | 180/65.265 |
| 8,052,571 B2* | 11/2011 | Yamada et al. | 477/20 |
| 8,056,659 B2* | 11/2011 | Oba et al. | 180/65.25 |
| 8,091,661 B2* | 1/2012 | Oba et al. | 180/65.25 |
| 8,100,207 B2* | 1/2012 | Oba et al. | 180/65.285 |
| 8,122,983 B2* | 2/2012 | Katsuta et al. | 180/65.225 |
| 2002/0088288 A1* | 7/2002 | Bowen | 74/331 |
| 2005/0137042 A1* | 6/2005 | Schmidt et al. | 475/5 |
| 2006/0046886 A1* | 3/2006 | Holmes et al. | 475/5 |
| 2006/0105876 A1* | 5/2006 | Holmes | 475/5 |
| 2007/0066432 A1* | 3/2007 | Schmidt | 475/5 |
| 2007/0093341 A1* | 4/2007 | Supina et al. | 475/5 |
| 2007/0243966 A1* | 10/2007 | Holmes et al. | 475/5 |
| 2008/0053723 A1* | 3/2008 | Kozarekar | 180/65.2 |
| 2008/0064550 A1* | 3/2008 | Holmes | 475/5 |
| 2008/0083292 A1* | 4/2008 | Muta et al. | 74/336 R |
| 2008/0207372 A1* | 8/2008 | Holmes et al. | 475/5 |
| 2008/0300099 A1* | 12/2008 | Yamamoto et al. | 477/3 |
| 2008/0300744 A1* | 12/2008 | Katsuta et al. | 701/22 |
| 2008/0312021 A1* | 12/2008 | Oba | 475/5 |
| 2008/0318721 A1* | 12/2008 | Oba et al. | 475/5 |
| 2008/0318730 A1* | 12/2008 | Endo | 477/52 |
| 2009/0118884 A1* | 5/2009 | Heap | 701/22 |
| 2009/0203495 A1* | 8/2009 | Muta et al. | 477/3 |
| 2009/0250278 A1* | 10/2009 | Kawasaki et al. | 180/65.275 |
| 2009/0301800 A1* | 12/2009 | Oba et al. | 180/65.25 |
| 2009/0314560 A1* | 12/2009 | Oba et al. | 180/65.22 |
| 2009/0314564 A1* | 12/2009 | Okamura et al. | 180/65.285 |
| 2010/0000814 A1* | 1/2010 | Katsuta et al. | 180/65.265 |
| 2010/0012405 A1* | 1/2010 | Katsuta et al. | 180/65.22 |
| 2010/0012407 A1* | 1/2010 | Oba et al. | 180/65.23 |
| 2010/0018788 A1* | 1/2010 | Katsuta et al. | 180/65.225 |
| 2010/0029436 A1* | 2/2010 | Katsuta et al. | 477/5 |
| 2010/0032217 A1* | 2/2010 | Katsuta et al. | 180/65.23 |
| 2010/0032218 A1* | 2/2010 | Ideshio et al. | 180/65.225 |
| 2010/0038157 A1* | 2/2010 | Oba et al. | 180/65.235 |
| 2010/0051360 A1* | 3/2010 | Oba et al. | 180/65.22 |
| 2010/0051361 A1* | 3/2010 | Katsuta et al. | 180/65.23 |
| 2010/0078238 A1* | 4/2010 | Oba et al. | 180/65.225 |
| 2010/0113213 A1* | 5/2010 | Oba et al. | 477/5 |
| 2010/0147610 A1* | 6/2010 | Katsuta et al. | 180/65.265 |
| 2010/0204862 A1* | 8/2010 | Uejima et al. | 701/22 |
| 2011/0054727 A1* | 3/2011 | Ebuchi et al. | 701/22 |
| 2011/0111910 A1* | 5/2011 | Ideshio et al. | 475/5 |
| 2011/0136607 A1* | 6/2011 | Samie et al. | 475/2 |
| 2011/0256974 A1* | 10/2011 | Okuwaki | 475/5 |
| 2011/0275466 A1* | 11/2011 | Rask et al. | 475/5 |

FOREIGN PATENT DOCUMENTS

| | | |
|---|---|---|
| JP | 10-058990 A | 3/1998 |
| JP | 11-227476 A | 8/1999 |
| JP | 2000-108693 A | 4/2000 |
| JP | 2000-326739 A | 11/2000 |
| JP | 2003-104072 A | 4/2003 |
| JP | 2003-106389 A | 4/2003 |
| JP | 2005-125876 A | 5/2005 |
| JP | 2005-155891 A | 6/2005 |
| JP | 2005-170227 A | 6/2005 |
| JP | 2005-297786 A | 10/2005 |

* cited by examiner

POWER OUTPUT APPARATUS AND HYBRID VEHICLE

This is a 371 national phase application of PCT/JP2007/066908 filed 30 Aug. 2007, claiming priority to Japanese Patent Application No. JP 2006-241932 filed 6 Sep. 2006, the contents of which are incorporated herein by reference.

TECHNICAL FIELD

The present invention relates to a power output apparatus configured to output power to a driveshaft, as well as to a hybrid vehicle equipped with such a power output apparatus.

BACKGROUND ART

One proposed structure of the power output apparatus includes an internal combustion engine, two motors, a Ravigneaux planetary gear mechanism, and a parallel shaft-type transmission arranged to selectively link two output elements of the planetary gear mechanism to an output shaft (see, for example, Patent Document 1). The power output apparatus of this proposed structure is applicable to the front wheel-drive vehicle. In the power output apparatus of this structure, the internal combustion engine is horizontally arranged, and the internal combustion engine, the planetary gear mechanism, the two motors, and the parallel shaft-type transmission have rotating shafts extended in parallel to one another. Another proposed structure of the power output apparatus has a planetary gear mechanism including an input element connected with an internal combustion engine and two output elements, and a parallel shaft-type transmission including a countershaft connected with the respective output elements of the planetary gear mechanism (see, for example, Patent Document 2). In the power output apparatus of this proposed structure, the two output elements of the planetary gear mechanism are respectively fixed to the inner circumferences of corresponding rotors in an electric driving system. A conventionally known structure of the power output apparatus has a power distribution mechanism including an input element connected with an internal combustion engine, a reactive force element connected with a first motor generator, and an output element connected with a second motor generator, and two clutches arranged to selectively link an axle as an output member with the output element or with the reactive force element of the power distribution mechanism (see, for example, Patent Document 3). In the power output apparatus of this conventional structure, when the first motor generator is rotated at a negative rotation speed to perform power operation, the two clutches are controlled to connect the reactive force element of the power distribution mechanism with the output member and disconnect the output element of the power distribution mechanism from the output member. Such control prevents the occurrence of power circulation where the first motor generator is driven with electric power generated by the second motor generator that uses part of the power of the output member.

Patent Document 1: Japanese Patent Laid-Open No. 2005-155891
Patent Document 2: Japanese Patent Laid-Open No. 2003-106389
Patent Document 3: Japanese Patent Laid-Open No. 2005-125876

DISCLOSURE OF THE INVENTION

In the power output apparatuses of such prior art structures, the output of a required power to the driveshaft is controlled with torque conversion of the output power of the internal combustion engine by the two motors, in order to drive the internal combustion engine at drive points of high efficiency. From the view point of improving the power transmission efficiency in a wider driving range, there is, however, still some room for improvement in such conventional power output apparatuses.

There would thus be a demand for providing a power output apparatus having improved power transmission efficiency in a wide driving range, as well as a hybrid vehicle equipped with such a power output apparatus.

The present invention accomplishes at least part of the demand mentioned above and the other relevant demands by the following configurations applied to the power output apparatus and to the hybrid vehicle.

According to one aspect, the invention is directed to a power output apparatus configured to output power to a driveshaft. The power output apparatus includes: an internal combustion engine; a first motor designed to input and output power; a second motor designed to input and output power; a power distribution integration mechanism constructed to have a first element connecting with a rotating shaft of the first motor, a second element connecting with a rotating shaft of the second motor, and a third element connecting with an engine shaft of the internal combustion engine and to allow differential rotations of the three elements; and a speed change-transmission assembly including: a power transmission mechanism configured to connect one of the first element and the second element of the power distribution integration mechanism with the driveshaft and to transmit power from the connected one of the first element and the second element to the driveshaft at a preset speed ratio; and a fixed speed ratio setting mechanism configured to, when one of the first element and the second element is connected with the driveshaft by the power transmission mechanism, connect the other of the first element and the second element with the driveshaft and to transmit power from the internal combustion engine to the driveshaft at a constant or fixed speed ratio.

The speed change-transmission assembly provided on the power output apparatus according to this aspect of the invention has the power transmission mechanism and the fixed speed ratio setting mechanism. The power transmission mechanism connects one of the first element and the second element of the power distribution integration mechanism with the driveshaft and transmits the power from one of the first element and the second element to the driveshaft at the preset speed ratio. The fixed speed ratio setting mechanism connects the other of the first element and the second element with the driveshaft and transmits the power from the internal combustion engine to the driveshaft at the constant or fixed speed ratio when one of the first element and the second element is connected with the driveshaft by the power transmission mechanism. In the power output apparatus of this configuration, connection of the power distribution integration mechanism with the driveshaft by means of the power transmission mechanism of the speed change-transmission assembly enables the power from one of the first element and the second element to be transmitted to the driveshaft at the preset speed ratio. In the state of connecting one of the first element and the second element of the power distribution integration mechanism with the driveshaft by means of the power transmission mechanism of the speed change-transmission assembly, connection of the other of the first element and the second element with the driveshaft enables the power from the internal combustion engine to be transmitted mechanically to the driveshaft at the fixed speed ratio without conversion into electrical energy. The power output apparatus according to this aspect of the invention accordingly has the improved power transmission efficiency in the wide driving range.

In one preferable application of the power output apparatus according to the above aspect of the invention, the speed change-transmission assembly is a parallel shaft-type transmission including: a first speed change mechanism having at least one parallel shaft-type gear train arranged to connect one of the first element and the second element of the power distribution integration mechanism with the driveshaft; and a second speed change mechanism having at least one parallel shaft-type gear train arranged to connect the other of the first element and the second element with the driveshaft. The power transmission mechanism may be equivalent to one of the first speed change mechanism and the second speed change mechanism. The fixed speed ratio setting mechanism may be a parallel shaft-type gear train that is included in the other of the first speed change mechanism and the second speed change mechanism and is not used alone to set a speed ratio. In the speed change-transmission assembly constructed as the parallel shaft-type transmission, connection of the power distribution integration mechanism with the driveshaft by means of one of the first speed change mechanism and the second speed change mechanism enables the power from the first element or the second element of the power distribution integration mechanism to be transmitted to the driveshaft at a speed ratio of the first speed change mechanism or at a speed ratio of the second speed change mechanism. In the state of connecting one of the first element and the second element of the power distribution integration mechanism with the driveshaft by means of either the first speed change mechanism or the second speed change mechanism as the power transmission mechanism, connection of the other of the first element and the second element with the driveshaft by means of the parallel shaft-type gear train as the fixed speed ratio setting mechanism included in the other of the first speed change mechanism and the second speed change mechanism enables the power from the internal combustion engine to be transmitted mechanically to the driveshaft at the fixed speed ratio. In the speed change-transmission assembly of this configuration, the parallel shaft-type gear train as the fixed speed ratio setting mechanism is not used alone to set the speed ratio. This arrangement enables the gear ratio of the parallel shaft-type gear train to be set arbitrarily, for example, to be set to an extremely small value, thus allowing arbitrary setting of the fixed speed ratio.

In another preferable application of the power output apparatus according to the above aspect of the invention, the power transmission mechanism of the speed change-transmission assembly continuously connects one of the first element and the second element with the driveshaft. In the state of continuously connecting one of the first element and the second element of the power distribution integration mechanism with the driveshaft by means of the power transmission mechanism, one of the first element and the second element of the power distribution integration mechanism is basically specified to the output element. In this state, providing the fixed speed ratio setting mechanism in the speed change-transmission assembly allows mechanical transmission of the power from the internal combustion engine to the driveshaft at the fixed speed ratio. This arrangement effectively improves the power transmission efficiency in the wider driving range.

In one preferable embodiment of the power output apparatus of this application, the fixed speed ratio setting mechanism is configured to selectively set the fixed speed ratio among multiple different values. In this embodiment, the fixed speed ratio setting mechanism may include multiple parallel shaft-type gear trains that have mutually different gear ratios and are selectively used to connect the other of the first element and the second element with the driveshaft. The power output apparatus of this configuration enables the power from the internal combustion engine to be mechanically transmitted to the driveshaft at the fixed speed ratio, which is selectively set among the multiple different values. This arrangement ensures the improved power transmission efficiency in the wider driving range.

In still another preferable application of the power output apparatus according to the above aspect of the invention, the speed change-transmission assembly is a planetary gear-type transmission including a first speed change mechanism and a second speed change mechanism. The first speed change mechanism has: a first change-speed planetary gear mechanism configured to have an input element connecting with the first element of the power distribution integration mechanism, an output element connecting with the driveshaft, and a fixable element and to allow differential rotations of the three elements; and a first fixation mechanism configured to fix the fixable element of the first change-speed planetary gear mechanism in a non-rotatable manner. The second speed change mechanism has: a second change-speed planetary gear mechanism configured to have an input element connecting with the second element of the power distribution integration mechanism, an output element connecting with the driveshaft, and a fixable element and to allow differential rotations of the three elements; and a second fixation mechanism configured to fix the fixable element of the second change-speed planetary gear mechanism in a non-rotatable manner. The power transmission mechanism is equivalent to one of the first speed change mechanism and the second speed change mechanism. The fixed speed ratio setting mechanism is equivalent to the first fixation mechanism or the second fixation mechanism included in the other of the first speed change mechanism and the second speed change mechanism. In the speed change-transmission assembly constructed as the planetary gear-type transmission, non-rotatable fixation of the fixable element of the first change-speed planetary gear mechanism by means of the first fixation mechanism in combination with release of the second fixation mechanism causes the power from the first element of the power distribution integration mechanism to be subjected to speed change at a speed ratio based on a gear ratio of the first change-speed planetary gear mechanism and to be transmitted to the driveshaft. Non-rotatable fixation of the fixable element of the second change-speed planetary gear mechanism by the second fixation mechanism in combination with release of the first fixation mechanism causes the power from the second element of the power distribution integration mechanism to be subjected to speed change at a speed ratio based on a gear ratio of the second change-speed planetary gear mechanism and to be transmitted to the driveshaft. In the state of fixation of the corresponding fixable element by one of the first fixation mechanism and the second fixation mechanism and connection of the power distribution integration mechanism with the driveshaft by means one of the first speed change mechanism and the second speed change mechanism (first change-speed planetary gear mechanism and second change-speed planetary gear mechanism), fixation of the corresponding fixable element by the other of the first fixation mechanism of the first speed change mechanism and the second fixation mechanism of the second speed change mechanism causes both the fixable elements of the first change-speed planetary gear mechanism and the second change-speed planetary gear mechanism to be fixed in the non-rotatable manner by means of the first fixation mechanism and the second fixation mechanism. This arrangement enables the power from the internal combustion engine to be mechanically transmitted to the driveshaft at the fixed speed ratio.

In one preferable embodiment of the power output apparatus of this application, the speed change-transmission assembly further includes a change-speed connecting-disconnecting mechanism configured to connect and disconnect the output element with and from the fixable element in one of the first change-speed planetary gear mechanism and the second change-speed planetary gear mechanism. In the speed change-transmission assembly of this configuration, non-rotatable fixation of the fixable element of the first or the second change-speed planetary gear mechanism, which does not respond to the change-speed connecting-disconnecting mechanism, causes the non-responding first or second planetary gear mechanism to function as the power transmission mechanism. In the state of non-rotatable fixation of the fixable element of the first or the second change-speed planetary gear mechanism, which does not respond to the change-speed connecting-disconnecting mechanism, connection of the output element with the fixable element in the second or the first change-speed planetary gear mechanism, which responds to the change-speed connecting-disconnecting mechanism, by the change-speed connecting-disconnecting mechanism as the fixed speed ratio setting mechanism enables the power from the internal combustion engine to be mechanically transmitted to the driveshaft at the fixed speed ratio that is different from the fixed speed ratio in the state of non-rotatable fixation of the fixable elements of both the first and the second change-speed planetary gear mechanisms.

In one preferable embodiment of the invention, the power output apparatus further includes: a connecting-disconnecting device configured to allow one of connection and disconnection of the first motor with and from the first element, connection and disconnection of the second motor with and from the second element, and connection and disconnection of the internal combustion engine with and from the third element. In the power output apparatus equipped with the connecting-disconnecting device, when one of the connections is released by the connecting-disconnecting device, the function of the power distribution integration mechanism causes the internal combustion engine to be substantially separated from the first motor, the second motor, and the speed change-transmission assembly. In the state of the released connection by the connecting-disconnecting device with the operation of the internal combustion engine stopped, the power output apparatus of this embodiment causes the power from at least one of the first motor and the second motor to be transmitted to the driveshaft with high efficiency with a change of the speed ratio in the speed change-transmission assembly. Such configuration of the power output apparatus desirably decreases the maximum torques required for the first motor and the second motor and thereby allows size reduction of the first motor and the second motor. The connecting-disconnecting device may be located between the first motor and the first element or between the second motor and the second element to allow connection and disconnection of the corresponding first or second motor with and from the first or second element. In the condition of the released connection by the connecting-disconnecting device, the speed change-transmission assembly may be arranged to transmit the power from the first motor or the second motor, which responds to the connecting-disconnecting device, to the driveshaft.

According to another aspect, the invention is also directed to a hybrid vehicle equipped with drive wheels driven with power transmitted from a driveshaft. The hybrid vehicle includes: an internal combustion engine; a first motor designed to input and output power; a second motor designed to input and output power; a power distribution integration mechanism constructed to have a first element connecting with a rotating shaft of the first motor, a second element connecting with a rotating shaft of the second motor, and a third element connecting with an engine shaft of the internal combustion engine and to allow differential rotations of the three elements; and a speed change-transmission assembly including: a power transmission mechanism configured to connect one of the first element and the second element of the power distribution integration mechanism with the driveshaft and to transmit power from the connected one of the first element and the second element to the driveshaft at a preset speed ratio; and a fixed speed ratio setting mechanism configured to, when one of the first element and the second element is connected with the driveshaft by the power transmission mechanism, connect the other of the first element and the second element with the driveshaft and to transmit power from the internal combustion engine to the driveshaft at a constant or fixed speed ratio.

The internal combustion engine, the first motor, the second motor, the power distribution integration mechanism, and the speed change-transmission assembly included in the hybrid vehicle constitute the power output apparatus of the invention that ensures the improved power transmission efficiency in the wide driving range. The hybrid vehicle of this configuration accordingly has both the high fuel consumption and the good driving performance.

In one preferable application of the hybrid vehicle according to the above aspect of the invention, the speed change-transmission assembly is a parallel shaft-type transmission including: a first speed change mechanism having at least one parallel shaft-type gear train arranged to connect one of the first element and the second element of the power distribution integration mechanism with the driveshaft; and a second speed change mechanism having at least one parallel shaft-type gear train arranged to connect the other of the first element and the second element with the driveshaft. The power transmission mechanism may be equivalent to one of the first speed change mechanism and the second speed change mechanism. The fixed speed ratio setting mechanism may be a parallel shaft-type gear train that is included in the other of the first speed change mechanism and the second speed change mechanism and is not used alone to set a speed ratio.

In another preferable application of the hybrid vehicle according to the above aspect of the invention, the power transmission mechanism of the speed change-transmission assembly continuously connects one of the first element and the second element with the driveshaft.

In one preferable embodiment of the hybrid vehicle of this application, the fixed speed ratio setting mechanism is configured to selectively set the fixed speed ratio among multiple different values.

In this embodiment, the fixed speed ratio setting mechanism may include multiple parallel shaft-type gear trains that have mutually different gear ratios and are selectively used to connect the other of the first element and the second element with the driveshaft.

In still another preferable application of the hybrid vehicle according to the above aspect of the invention, the speed change-transmission assembly is a planetary gear-type transmission including a first speed change mechanism and a second speed change mechanism. The first speed change mechanism has: a first change-speed planetary gear mechanism configured to have an input element connecting with the first element of the power distribution integration mechanism, an output element connecting with the driveshaft, and a fixable element and to allow differential rotations of the three elements; and a first fixation mechanism configured to fix the fixable element of the first change-speed planetary gear mechanism in a non-rotatable manner. The second speed change mechanism has: a second change-speed planetary gear mechanism configured to have an input element connecting with the second element of the power distribution integration mechanism, an output element connecting with the driveshaft, and a fixable element and to allow differential rotations of the three elements; and a second fixation mechanism configured to fix the fixable element of the second change-speed planetary gear mechanism in a non-rotatable manner. The power transmission mechanism is equivalent to one of the first speed change mechanism and the second speed change mechanism. The fixed speed ratio setting mechanism is equivalent to the first fixation mechanism or the second fixation mechanism included in the other of the first speed change mechanism and the second speed change mechanism.

In one preferable embodiment of the hybrid vehicle of this application, the speed change-transmission assembly further includes a change-speed connecting-disconnecting mechanism configured to connect and disconnect the output element with and from the fixable element in one of the first change-speed planetary gear mechanism and the second change-speed planetary gear mechanism.

In one preferable embodiment of the invention, the hybrid vehicle further includes: a connecting-disconnecting device configured to allow one of connection and disconnection of the first motor with and from the first element, connection and disconnection of the second motor with and from the second element, and connection and disconnection of the internal combustion engine with and from the third element.

BEST MODES OF CARRYING OUT THE INVENTION

Some modes of carrying out the invention are described below as preferred embodiments.

Figure 1:
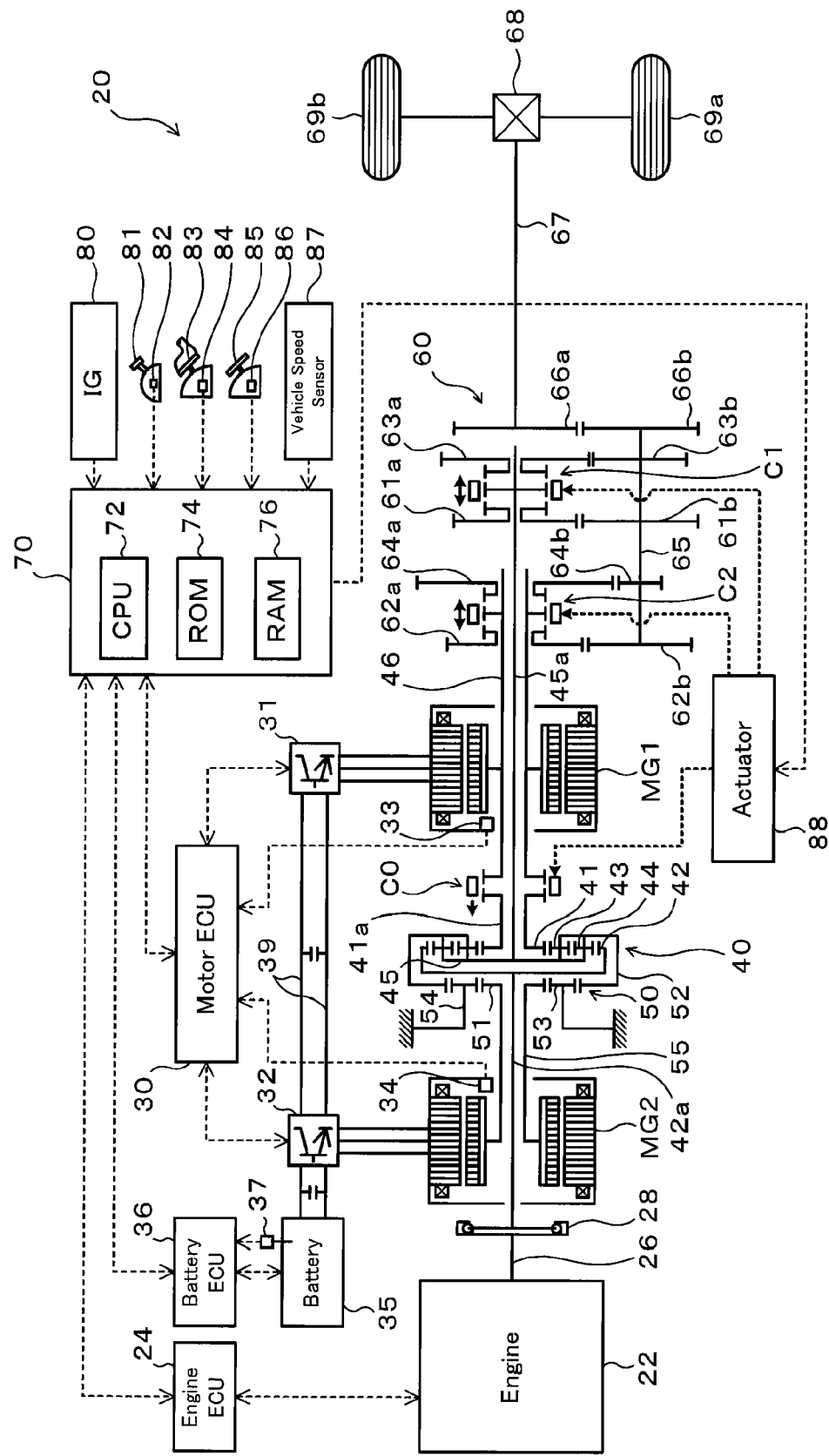
FIG. 1 schematically illustrates the configuration of a hybrid vehicle 20 in a first embodiment of the invention.

FIG. 1 schematically illustrates the configuration of a hybrid vehicle 20 in a first embodiment of the invention. The hybrid vehicle 20 shown in FIG. 1 is constructed as a rear-wheel drive vehicle and includes an engine 22 located in a front portion of the vehicle, a power distribution integration mechanism (differential rotation mechanism) 40 connected with a crankshaft 26 or an output of the engine 22, a motor MG1 connected with the power distribution integration mechanism 40 and designed to have power generation capability, a motor MG2 arranged coaxially with the motor MG1 to be connected with the power distribution integration mechanism 40 via a reduction gear mechanism 50 and designed to have power generation capability, a transmission 60 constructed to transmit the output power of the power distribution integration mechanism 40 to a driveshaft 67 with a speed change at a different speed ratio, and a hybrid electronic control unit 70 (hereafter referred to as 'hybrid ECU') configured to control the operations of the whole hybrid vehicle 20.

The engine 22 is constructed as an internal combustion engine designed to consume a hydrocarbon fuel, such as gasoline or light oil, and thereby generate power. The engine 22 is under operation controls, such as fuel injection control, ignition timing control, and intake air flow control, of an engine electronic control unit 24 (hereafter referred to as engine ECU). The engine ECU 24 inputs diverse signals from various sensors provided for the engine 22 to measure and detect the operating conditions of the engine 22. The engine ECU 24 establishes communication with the hybrid ECU 70 to control the operations of the engine 22 in response to control signals from the hybrid ECU 70 and with reference to the diverse signals from the various sensors and to output data regarding the operating conditions of the engine 22 to the hybrid ECU 70 according to the requirements.

The motors MG1 and MG2 are constructed as known synchronous motor generators to have operations as both a generator and a motor. The motors MG1 and MG2 are arranged to transmit electric power to and from a battery 35 or an accumulator via inverters 31 and 32. Power lines 39 connecting the battery 35 with the inverters 31 and 32 are structured as common positive bus and negative bus shared by the inverters 31 and 32. Such connection enables electric power generated by one of the motors MG1 and MG2 to be consumed by the other motor MG2 or MG1. The battery 35 may thus be charged with surplus electric power generated by either of the motors MG1 and MG2 and be discharged to supplement insufficient electric power. The battery 35 is neither charged nor discharged upon the balance of the input and output of electric powers between the motors MG1 and MG2. Both the motors MG1 and MG2 are driven and controlled by a motor electronic control unit 30 (hereafter referred to as motor ECU). The motor ECU 30 inputs various signals required for driving and controlling the motors MG1 and MG2, for example, signals representing rotational positions of rotors in the motors MG1 and MG2 from rotational position detection sensors 33 and 34 and signals representing phase currents to be applied to the motors MG1 and MG2 from current sensors (not shown). The motor ECU 30 outputs switching control signals to the inverters 31 and 32. The motor ECU 30 also computes rotation speeds Nm1 and Nm2 of the rotors in the motors MG1 and MG2 according to a rotation speed computation routine (not shown) based on the input signals from the rotational position detection sensors 33 and 34. The motor ECU 30 establishes communication with the hybrid ECU 70 to drive and control the motors MG1 and MG2 in response to control signals received from the hybrid ECU 70 and to output data regarding the operating conditions of the motors MG1 and MG2 to the hybrid ECU 70 according to the requirements.

The battery 35 is under control and management of a battery electronic control unit 36 (hereafter referred to as battery ECU). The battery ECU 36 inputs signals required for management and control of the battery 35, for example, an inter-terminal voltage from a voltage sensor (not shown) located between terminals of the battery 35, a charge-discharge current from a current sensor (not shown) located in the power line 39 connecting with the output terminal of the battery 35, and a battery temperature Tb from a temperature sensor 37 attached to the battery 35. The battery ECU 36 outputs data regarding the operating conditions of the battery 35 by communication to the hybrid ECU 70 and to the engine ECU 24 according to the requirements. For the purpose of control and management of the battery 35, the battery ECU 36 also performs an arithmetic operation of calculating a remaining charge or state of charge SOC of the battery 35 from an integrated value of the charge-discharge current.

The power distribution integration mechanism 40 is located, together with the motors MG1 and MG2, the reduction gear mechanism 50, and the transmission 60, in a transmission casing (not shown) and is arranged coaxially with the crankshaft 26 across a predetermined distance from the engine 22. The power distribution integration mechanism 40 of this embodiment is constructed as a double-pinion planetary gear mechanism including a sun gear 41 as an external gear, a ring gear 42 as an internal gear arranged concentrically with the sun gear 41, and a carrier 45 arranged to hold at least one set of two pinion gears 43 and 44 in such a manner as to allow both their revolutions and their rotations on their axes. The two pinion gears 43 and 44 engage with each other and are arranged to respectively engage with the sun gear 41 and engage with the ring gear 42. The power distribution integration mechanism 40 has the sun gear 41 (second element), the ring gear 42 (third element), and the carrier 45 (first element) as elements of differential rotation. The sun gear 41 as the second element of the power distribution integration mechanism 40 is connected with the motor MG1 (hollow rotor) or a second motor via a hollow sun gear shaft 41a extended from the sun gear 41 in an opposite direction to the engine 22 and a hollow first motor shaft 46 extended in the same direction (that is, toward a rear end of the vehicle). The carrier 45 as the first element is connected with the motor MG2 (hollow rotor) or a first motor via the reduction gear mechanism 50 located between the power distribution integration mechanism 40 and the engine 22 and a hollow second motor shaft 55 extended from the reduction gear mechanism 50 (a sun gear 51) toward the engine 22. The ring gear 42 as the third element is connected with the crankshaft 26 of the engine 22 via a ring gear shaft 42a extended to pass through the hollow second motor shaft 55 and the motor MG2 and a damper 28.

As shown in FIG. 1, a clutch C0 (connecting-disconnecting device) is provided between the sun gear shaft 41a and the first motor shaft 46 to connect and disconnect the sun gear shaft 41a with and from the first motor shaft 46. In the embodiment, the clutch C0 is structured, for example, as a dog clutch to make a dog element fastened to an end of the sun gear shaft 41a engage with a dog element fastened to an end of the first motor shaft 46 with little loss and to release the engagement. The clutch C0 is actuated by an electric, electromagnetic, or hydraulic actuator 88. Releasing the clutch C0 disconnects the sun gear shaft 41a from the first motor shaft 46 and thereby separates the motor MG1 or the second motor from the sun gear 41 as the second element of the power distribution integration mechanism 40. The function of the power distribution integration mechanism 40 substantially separates the engine 22 from the motors MG1 and MG2 and the transmission 60.

The first motor shaft 46 connectable with the sung gear 41 of the power distribution integration mechanism 40 by means of the clutch C0 is further extended from the motor MG1 in the opposite direction to the engine 22 (that is, toward the rear end of the vehicle) and is connected to the transmission 60. A carrier shaft (connecting shaft) 45a is extended from the carrier 45 of the power distribution integration mechanism 40 in the opposite direction to the engine 22 (that is, toward the rear end of the vehicle) to pass through the hollow sun gear shaft 41a and the hollow first motor shaft 46 and is also connected to the transmission 60. In the structure of the embodiment, the power distribution integration mechanism 40 is located between the coaxial motors MG1 and MG2 and is arranged coaxially with both the motors MG1 and MG2. The engine 22 is arranged coaxially with the motor MG2 and is located opposite to the transmission 60 across the power distribution integration mechanism 40. Namely the engine 22, the motors MG1 and MG2, the power distribution integration mechanism 40, and the transmission 60 as the constituents of the power output apparatus in the embodiment are arranged in the sequence of the engine 22, the motor MG2, (reduction gear mechanism 50), the power distribution integration mechanism 40, the motor MG1, and the transmission 60 in a direction from the front end toward the rear end of the vehicle. The power output apparatus of this arrangement is small-sized and is specifically suitable for being mounted on the hybrid vehicle 20 of the rear-wheel drive-based system.

In the structure of the embodiment, as explained above, the sun gear 41 as the second element of the power distribution integration mechanism 40 is connected to the transmission 60 via the sun gear shaft 41a, the clutch C0, and the first motor shaft 46, while the carrier 45 as the first element of the power distribution integration mechanism 40 is connected to the transmission 60 via the carrier shaft 45a. In the hybrid vehicle 20, one of the sun gear 41 and the carrier 45 in the power distribution integration mechanism 40 is thus specified as a reactive force element to apply a reaction force against a torque output from the engine 22, whereas the other is specified as an output element to output power to the transmission 60. Specifying the sun gear 41 as the reactive force element causes the motor MG1 to function as a generator. In this state, the power distribution integration mechanism 40 distributes the power of the engine 22 input via the ring gear 42 into the sung gear 41 and the carrier 45 according to their gear ratio, while integrating the power of the engine 22 with the power of the motor MG2 functioning as a motor and transmitting the integrated power to the carrier 45. Specifying the carrier 45 as the reactive force element, on the other hand, causes the motor MG2 to function as a generator. In this state, the power distribution integration mechanism 40 distributes the power of the engine 22 input via the ring gear 42 into the sun gear 41 and the carrier 45 according to their gear ratio, while integrating the power of the engine 22 with the power of the motor MG1 functioning as a motor and transmitting the integrated power to the sun gear 41.

The reduction gear mechanism 50 is constructed as a single-pinion planetary gear mechanism including a sun gear 51 as an external gear, a ring gear 52 as an internal gear arranged concentrically with the sun gear 51, multiple pinion gears 53 arranged to engage with both the sun gear 51 and the ring gear 52, and a carrier 54 arranged to hold the multiple pinion gears 53 in such a manner as to allow both their revolutions and their rotations on their axes. The sun gear 51 of the reduction gear mechanism 50 is connected to the rotor of the motor MG2 via the second motor shaft 55. The ring gear 52 of the reduction gear mechanism 50 is fixed to the carrier 45 of the power distribution integration mechanism 40, so that the reduction gear mechanism 50 is substantially integrated with the power distribution integration mechanism 40. The carrier 54 of the reduction gear mechanism 50 is fixed to the transmission casing. The function of the reduction gear mechanism 50 reduces the speed of the power from the motor MG2 and transmits the power of the reduced speed to the carrier 45 of the power distribution integration mechanism 40, while increasing the speed of the power from the carrier 45 and transmitting the power of the increased speed to the motor MG2. In the structure of the embodiment, the reduction gear mechanism 50 is located between the motor MG2 and the power distribution integration mechanism 40 and is integrated with the power distribution integration mechanism 40. This arrangement allows the further size reduction of the power output apparatus.

The transmission 60 is constructed as a parallel shaft-type automatic transmission having a speed ratio selectively changeable among multiple different values. The transmission 60 includes a first counter drive gear 61a and a first counter driven gear 61b forming a first speed gear train, a second counter drive gear 62a and a second counter driven gear 62b forming a second speed gear train, a third counter drive gear 63a and a third counter driven gear 63b forming a third speed gear train, an interlocking gear 64a and a mating interlocking gear 64b forming a fixed speed ratio setting gear train (fixed speed ratio setting mechanism) that is not used alone to set the speed ratio, a countershaft 65 with the respective counter driven gears 61b through 63b, the interlocking gear 64b, and a gear 66b fixed thereon, clutches C1 and C2, a gear 66a attached to the driveshaft 67, and a reverse gear train (not shown). In the description below, the counter drive gears and the counter driven gears may be simply called 'gears'. In the transmission 60, the speed ratio has a largest value for the first speed gear train and decreases with a shift to the second speed gear train and further to the third speed gear train that defines a minimum speed ratio. The gear ratio of the interlocking gear 64a and the mating interlocking gear 64b forming the fixed speed ratio setting gear train is set to be extremely smaller than the speed ratio of the third speed gear train that specifies the minimum speed ratio.

As shown in FIG. 1, the first gear 61a of the first speed gear train is fastened in a rotatable but axially unmovable manner on the carrier shaft 45a, which is extended from the carrier 45 as the first element of the power distribution integration mechanism 40, and continuously engages with the first gear 61b fixed on the countershaft 65. Similarly the third gear 63a of the third speed gear train is fastened in a rotatable but axially unmovable manner on the carrier shaft 45a and continuously engages with the third gear 61b fixed on the countershaft 65. In the structure of this embodiment, the clutch C1 is provided on the side of the carrier shaft 45a (on the side of the counter drive gears) to selectively fix one of the first gear 61a (first speed gear train) and the third gear 63a (third speed gear train) to the carrier shaft 45a and to release both the first gear 61a and the third gear 63a from the carrier shaft 45a and thereby make the first gear 61a and the third gear 63a rotatable relative to the carrier shaft 45a. The clutch C1 is structured, for example, as a dog clutch to make a dog element fastened on the carrier shaft 45a in a non-rotatable but axially movable manner engage with either one of a dog element fastened on the first gear 61a and a dog element fastened on the third gear 63a with little loss and to release the engagement. The clutch C1 is actuated by the actuator 88. The gears 61a and 61b of the first speed gear train, the gears 63a and 63b of the third speed gear train, and the clutch C1 cooperatively work as a first speed change mechanism of the transmission 60. The second gear 62a of the second speed gear train is fastened in a rotatable but axially unmovable manner on the first motor shaft 46, which is linkable with the sun gear 41 as the second element of the power distribution integration mechanism 40 via the clutch C0, and continuously engages with the second gear 62b fixed on the countershaft 65. Similarly the interlocking gear 64a of the fixed speed ratio setting gear train is fastened in a rotatable but axially unmovable manner on the first motor shaft 46 and continuously engages with the mating interlocking gear 64b fixed on the countershaft 65. In the structure of this embodiment, the clutch C2 is provided on the side of the first motor shaft 46 (on the side of the counter drive gears) to selectively fix one of the second gear 62a (second speed gear train) and the interlocking gear 64a (fixed speed ratio setting gear train) to the first motor shaft 46 and to release both the second gear 62a and the interlocking gear 64a from the first motor shaft 46 and thereby make the second gear 62a and the interlocking gear 64a rotatable relative to the first motor shaft 46. The clutch C2 is also structured, for example, as a dog clutch to make a dog element fastened on the first motor shaft 46 in a non-rotatable but axially movable manner engage with either one of a dog element fastened on the second gear 62a and a dog element fastened on the interlocking gear 64a with little loss and to release the engagement. The clutch C2 is also actuated by the actuator 88. The gears 62a and 62b of the second speed gear train, the gears 64a and 64b of the fixed speed ratio setting gear train, and the clutch C2 cooperatively work as a second speed change mechanism of the transmission 60. The actuator 88 is shown as one integral body in the illustration of the embodiment but is designed to individually actuate the clutches C0, C1, and C2.

In the transmission 60 having the construction discussed above, the fixation of either one of the first gear 61a (first speed gear train) and the third gear 63a (third speed gear train) to the carrier shaft 45a by means of the clutch C1, in combination with the release of the clutch C2, causes the power from the carrier shaft 45a to be transmitted to the countershaft 65 via the first gear 61a (first speed gear train) or the third gear 63a (third speed gear train). The fixation of the second gear 62a (second speed gear train) to the first motor shaft 46 by means of the clutch C2, in combination with the coupling of the clutch C0 and the release of the clutch C1, causes the power from the first motor shaft 46 to be transmitted to the countershaft 65 via the second gear 62a (second speed gear train). The power transmitted from either the carrier shaft 45a or the first motor shaft 46 to the countershaft 65 is transmitted to the driveshaft 67 via the gears 66a and 66b and is eventually output to rear wheels 69a and 69b as drive wheels via a differential gear 68. In the description hereafter, the state of power transmission by the first speed gear train, the state of power transmission by the second speed gear train, and the state of power transmission by the third speed gear train are respectively referred to as 'first speed state ($1^{st}$ speed)', 'second speed state ($2^{nd}$ speed)', and 'third speed state ($3^{rd}$ speed)'. In the structure of the transmission 60 of the embodiment, the clutch C1 and the clutch C2 are respectively provided on the side of the carrier shaft 45a and on the side of the first motor shaft 46. This arrangement desirably reduces the potential loss in the fixation of the gears 61a to 64a to the carrier shaft 45a or the first motor shaft 46 by means of the clutches C1 and C2. In the second speed change mechanism including the fixed speed ratio setting gear train having an extremely small speed reduction ratio, the rotation speed of the interlocking gear 64a that idles prior to the fixation to the first motor shaft 46 by means of the clutch C2 becomes lower than the rotation speed of the mating interlocking gear 64b on the countershaft 65. Providing at least the clutch C2 on the side of the first motor shaft 46 allows the engagement of the dog element on the interlocking gear 64a with the dog element on the first motor shaft 46 with smaller loss. The degree of such loss reduction partly depends upon the ratio of the numbers of teeth in the respective gear trains. In the first speed change mechanism including the first speed gear train having a large speed reduction ratio, the clutch C1 may be provided on the side of the countershaft 65.

The hybrid ECU 70 is constructed as a microprocessor including a CPU 72, a ROM 74 configured to store processing programs, a RAM 76 configured to temporarily store data, input and output ports (not shown), and a communication port (not shown). The hybrid ECU 70 inputs, via its input port, an ignition signal from an ignition switch (start switch) 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver s depression amount of a brake pedal 85 from a brake pedal position sensor 86, and a vehicle speed V from a vehicle speed sensor 87. The hybrid ECU 70 makes connection with the engine ECU 24, the motor ECU 30, and the battery ECU 36 via its communication port to transmit various control signals and data to and from the engine ECU 24, the motor ECU 30, and the battery ECU 36 as mentioned previously. The actuator 88 actuating the clutch C0 and the clutches C1 and C2 of the transmission 60 is also under control of the hybrid ECU 70.

The following describes series of operations of the hybrid vehicle 20 in the first embodiment having the configuration discussed above.

FIGS. 2 through 8 show torque-rotation speed dynamics of primary elements in the power distribution integration mechanism 40 and in the transmission 60 in the case of an upshift of the speed ratio of the transmission 60 with a change of the vehicle speed during a drive of the hybrid vehicle 20 with operation of the engine 22. During the drive of the hybrid vehicle 20 with the speed change shown in FIG. 2 to FIG. 8, under the overall control of the hybrid ECU 70 based on the driver's depression amount of the accelerator pedal 83 and the vehicle speed V, the engine 22 and the motors MG1 and MG2 are respectively controlled by the engine ECU 24 and by the motor ECU 30. The actuator 88 (for actuating the clutch C0 and the clutches C1 and C2 of the transmission 60) is directly controlled by the hybrid ECU 70. In the charts of FIGS. 2 through 8, an S-axis represents a rotation speed of the sun gear 41 in the power distribution integration mechanism 40 (equivalent to a rotation speed Nm1 of the motor MG1 or the first motor shaft 46). An R-axis represents a rotation speed of the ring gear 42 in the power distribution integration mechanism 40 (equivalent to a rotation speed Ne of the engine 22). A C-axis represents a rotation speed of the carrier 45 in the power distribution integration mechanism 40 (equivalent to a rotation speed of the carrier shaft 45a and a rotation speed of the ring gear 52 in the reduction gear mechanism 50). 61a-axis to 64a-axis, 65-axis, and 67-axis respectively represent rotation speeds of the first gear 61a to the interlocking gear 64a in the transmission 60, a rotation speed of the countershaft 65, and a rotation speed of the driveshaft 67.

Figure 2:
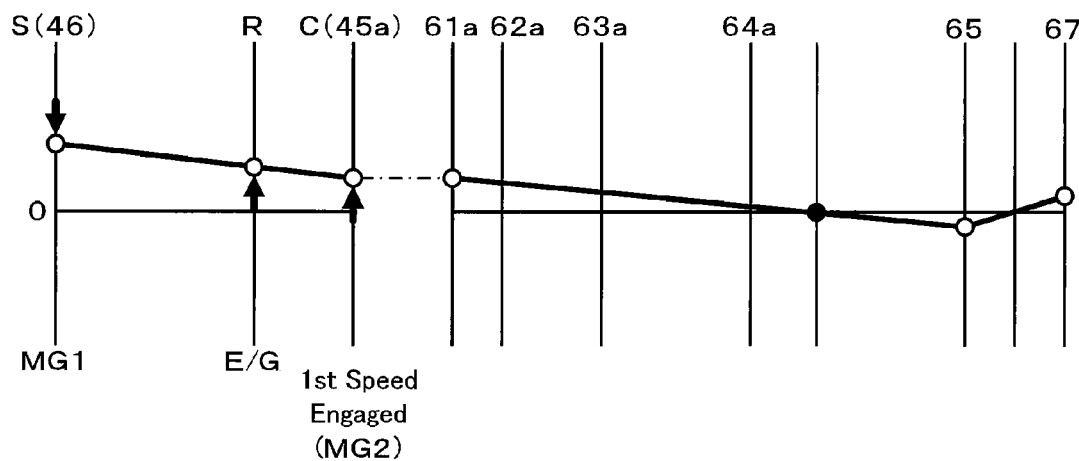
FIG. 2 is an explanatory view showing torque-rotation speed dynamics of primary elements in a power distribution integration mechanism 40 and in a transmission 60 in the case of an upshift of the speed ratio of the transmission 60 with a change of the vehicle speed during a drive of the hybrid vehicle 20 of the first embodiment with operation of an engine 22.
Figure 8:
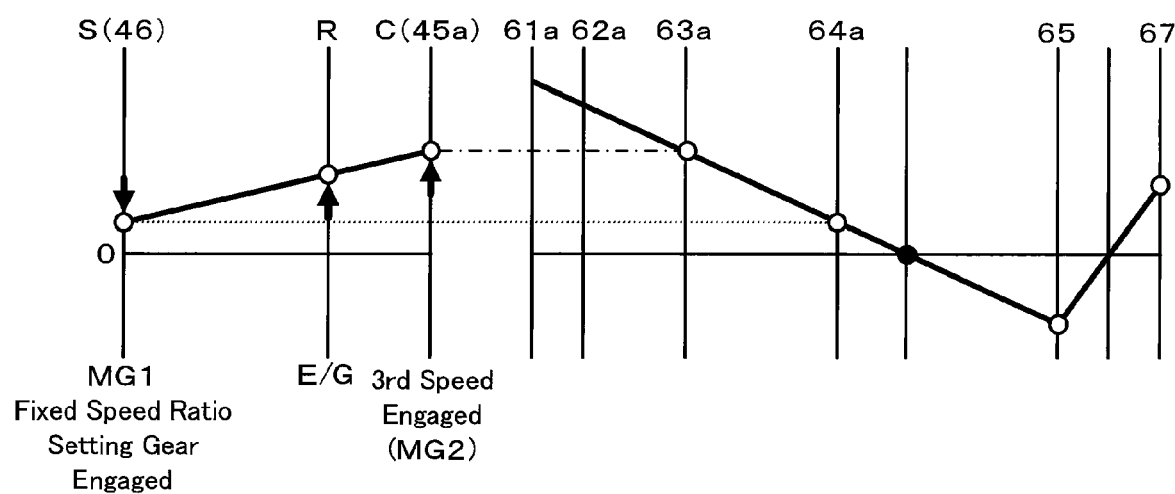
FIG. 8 is an explanatory view similar to FIG. 2.
Figure 9:
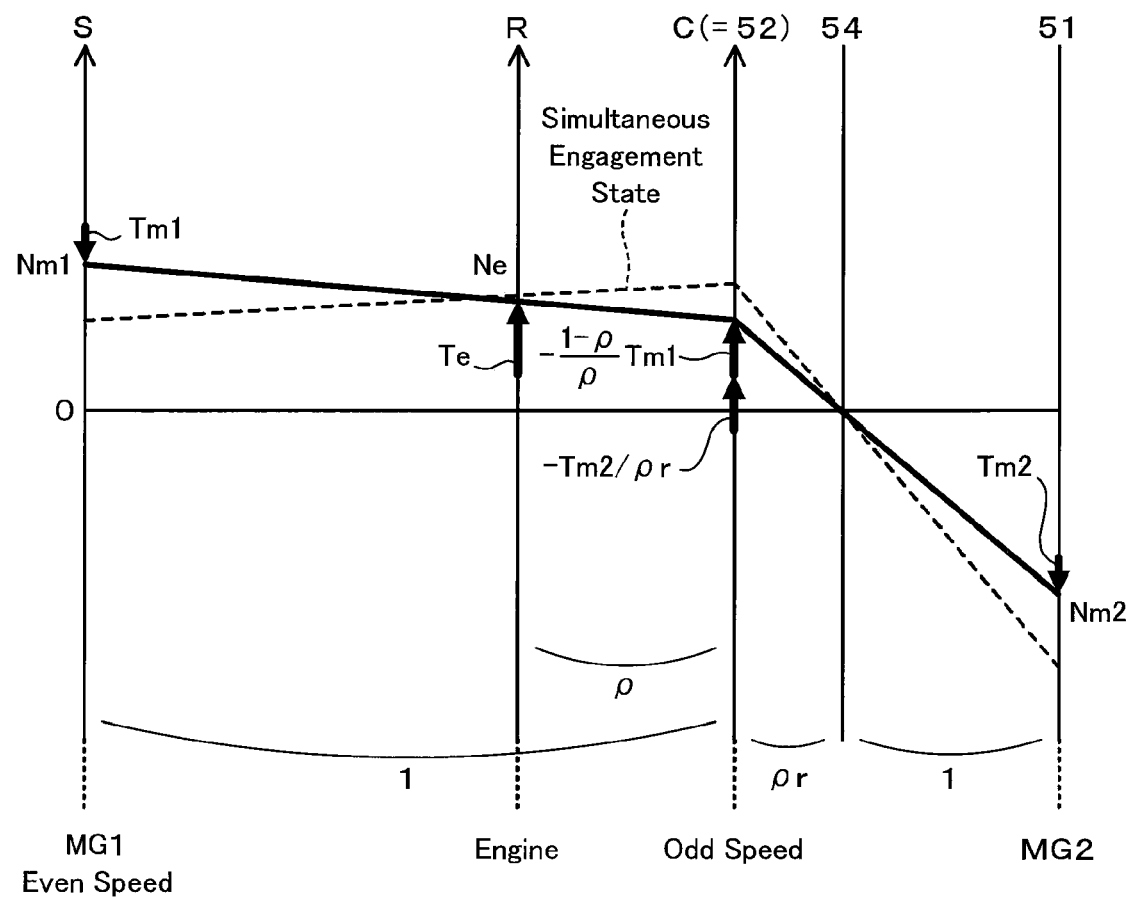
FIG. 9 is an alignment chart showing torque-rotation speed dynamics of the respective elements in the power distribution integration mechanism 40 and in a reduction gear mechanism 50 in a mode of making a motor MG1 function as a generator and a motor MG2 function as a motor.

On a start of the hybrid vehicle 20, while the clutch C0 is coupled and the clutch C2 of the transmission 60 is released, the clutch C1 is coupled to fix the first gear 61a (first speed gear train) to the carrier shaft 45a (carrier 45) as shown by the one-dot chain line in FIG. 2. In this state, the motors MG1 and MG2 are driven and controlled to specify the carrier 45 of the power distribution integration mechanism 40 to the output element and to cause the motor MG2 connecting with the carrier 45 to function as a motor, while being driven and controlled to specify the sun gear 41 of the power distribution integration mechanism 40 to the reactive force element and to cause the motor MG1 connecting with the sun gear 41 to function as a generator. In the description hereafter, this mode of making the motor MG1 function as a generator and the motor MG2 function as a motor is referred to as 'first torque conversion mode'. The alignment chart of FIG. 9 shows torque-rotation speed dynamics of the respective elements in the power distribution integration mechanism 40 and in the reduction gear mechanism 50 in the first torque conversion mode. In the alignment chart of FIG. 9, an S-axis, an R-axis, and a C-axis represent the same as those in the charts of FIGS. 2 through 8. A 54-axis represents a rotation speed of the carrier 54 in the reduction gear mechanism 50. A 51-axis represents a rotation speed of the sun gear 51 in the reduction gear mechanism 50 (equivalent to a rotation speed Nm2 of the motor MG2 or the second motor shaft 55). In FIG. 9, ρ and ρr respectively denote a gear ratio of the power distribution integration mechanism 40 (the number of teeth of the sun gear 41/the number of teeth of the ring gear 42) and a gear ratio of the reduction gear mechanism 50 (the number of teeth of the sun gear 51/the number of teeth of the ring gear 52). In the first torque conversion mode, the power of the engine 22 is subjected to torque conversion by the power distribution integration mechanism 40 and the motors MG1 and MG2 and is output to the carrier 45. Controlling the rotation speed of the motor MG1 continuously and steplessly varies the ratio of the rotation speed of the engine 22 to the rotation speed of the carrier 45 as the output element. The power output to the carrier 45 (carrier shaft 45a) is subjected to speed change (speed reduction) based on the speed ratio of the first speed gear train (first gears 61a and 61b) and is transmitted to the driveshaft 67.

In response to an increase in vehicle speed V of the hybrid vehicle 20 in the state of FIG. 2, that is, in the first speed state with selection of the first speed gear train, as the rotation speed of the motor MG1 functioning as a generator gradually decreases, the rotation speed of the first motor shaft 46 becomes substantially equal to the rotation speed of the second gear 62a engaging with the mating second gear 62b on the countershaft 65. This allows a shift from the first speed state (with the first speed gear train) to the second speed state (with the second speed gear train). For a shift from the first speed state to the second speed state, while the clutch C1 keeps the first gear 61a (first speed gear train) fixed to the carrier shaft 45a (carrier 45), the clutch C2 is coupled to fix the second gear 62a (second speed gear train) to the first motor shaft 46 (sun gear 41) with setting 0 to the torque commands of the motors MG1 and MG2, as shown by the one-dot chain line and the two-dot chain line in FIG. 3. In this state, both the motors MG1 and MG2 idle without performing either the power operation or the regenerative operation. The output power (torque) of the engine 22 is then mechanically (directly) transmitted to the driveshaft 67 at a fixed (constant) speed ratio (a value between the speed ratio of the first speed gear train and the speed ratio of the second speed gear train) without conversion into electrical energy. In the description hereafter, the mode of connecting both the sun gear 41 as the second element and the carrier 45 as the first element in the power distribution integration mechanism 40 to the driveshaft 67 by the transmission 60 is referred to as 'simultaneous engagement mode'. The state of FIG. 3 is specifically referred to as '1st speed-2nd speed simultaneous engagement state'.

Figure 4:
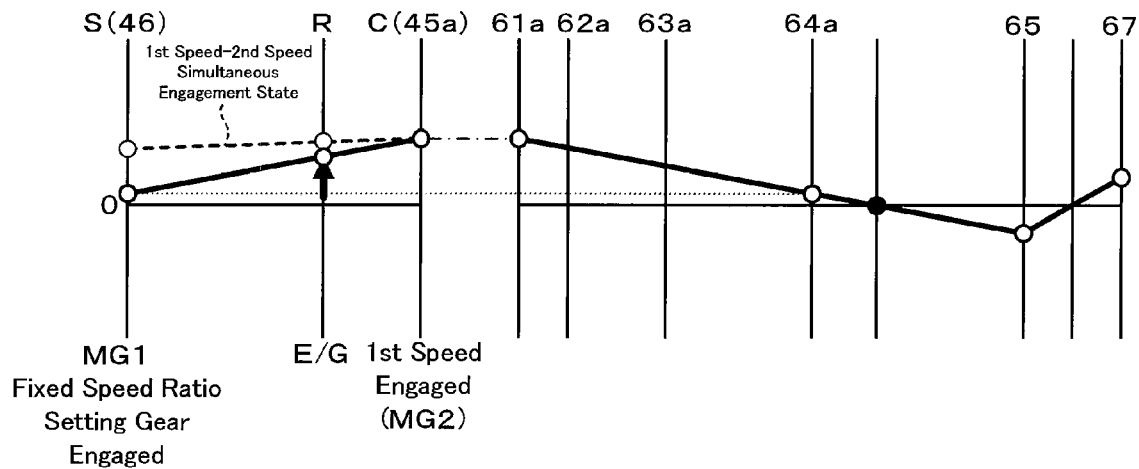
FIG. 4 is an explanatory view similar to FIG. 2.

In response to a further decrease in rotation speed of the motor MG1 functioning as a generator in the first speed state of FIG. 2, the rotation speed of the first motor shaft 46 is synchronized with the rotation speed of the interlocking gear 64a engaging with the mating interlocking gear 64b on the countershaft 65. After the synchronization, while the clutch C1 keeps the first gear 61a (first speed gear train) fixed to the carrier shaft 45a (carrier 45), the clutch C2 is coupled to fix the interlocking gear 64a (fixed speed ratio setting gear train) to the first motor shaft 46 (sun gear 41), as shown by the one-dot chain line and the dotted line in FIG. 4. Setting 0 to the torque commands of the motors MG1 and MG2 in this state causes the motors MG1 and MG2 to idle without performing either the power operation or the regenerative operation. The output power (torque) of the engine 22 is then mechanically (directly) transmitted to the driveshaft 67 at a fixed (constant) speed ratio, which is different from the fixed speed ratio in the $1^{st}$ speed-$2^{nd}$ speed simultaneous engagement state discussed above, without conversion into electrical energy. In the description hereafter, the mode of connecting the carrier 45 as the first element of the power distribution integration mechanism 40 to the driveshaft 67 via the first speed gear train and connecting the sun gear 41 as the second element to the driveshaft 67 via the fixed speed ratio setting gear train is also referred to as 'simultaneous engagement mode'. The state of FIG. 4 is specifically referred to as '$1^{st}$ speed fixation state'.

Figure 3:
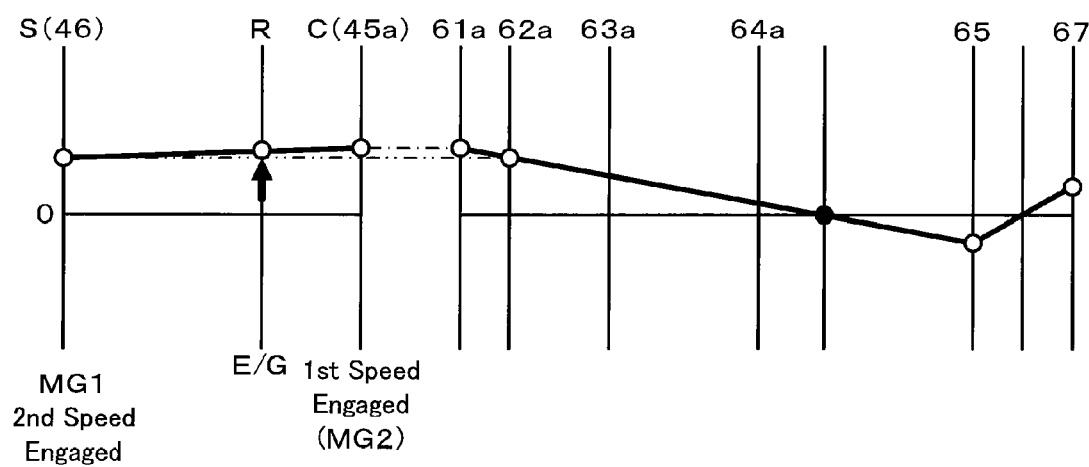
FIG. 3 is an explanatory view similar to FIG. 2.
Figure 5:
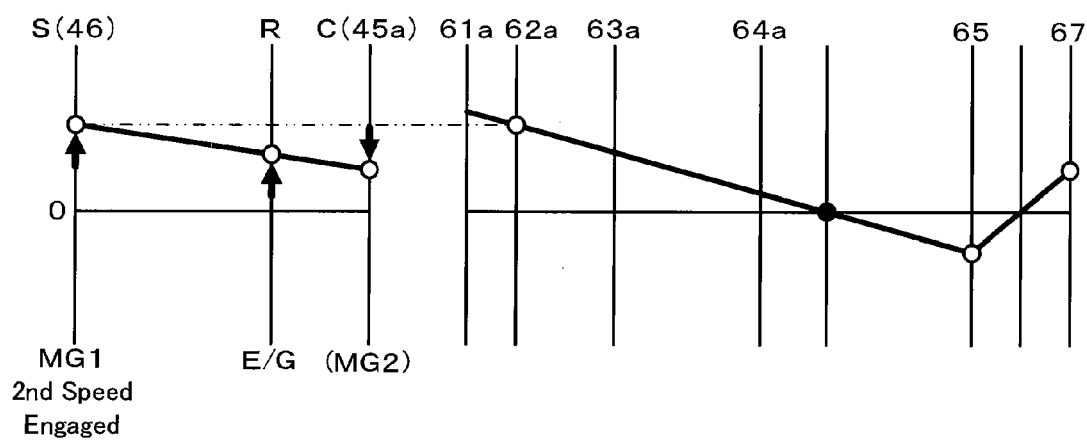
FIG. 5 is an explanatory view similar to FIG. 2.
Figure 10:
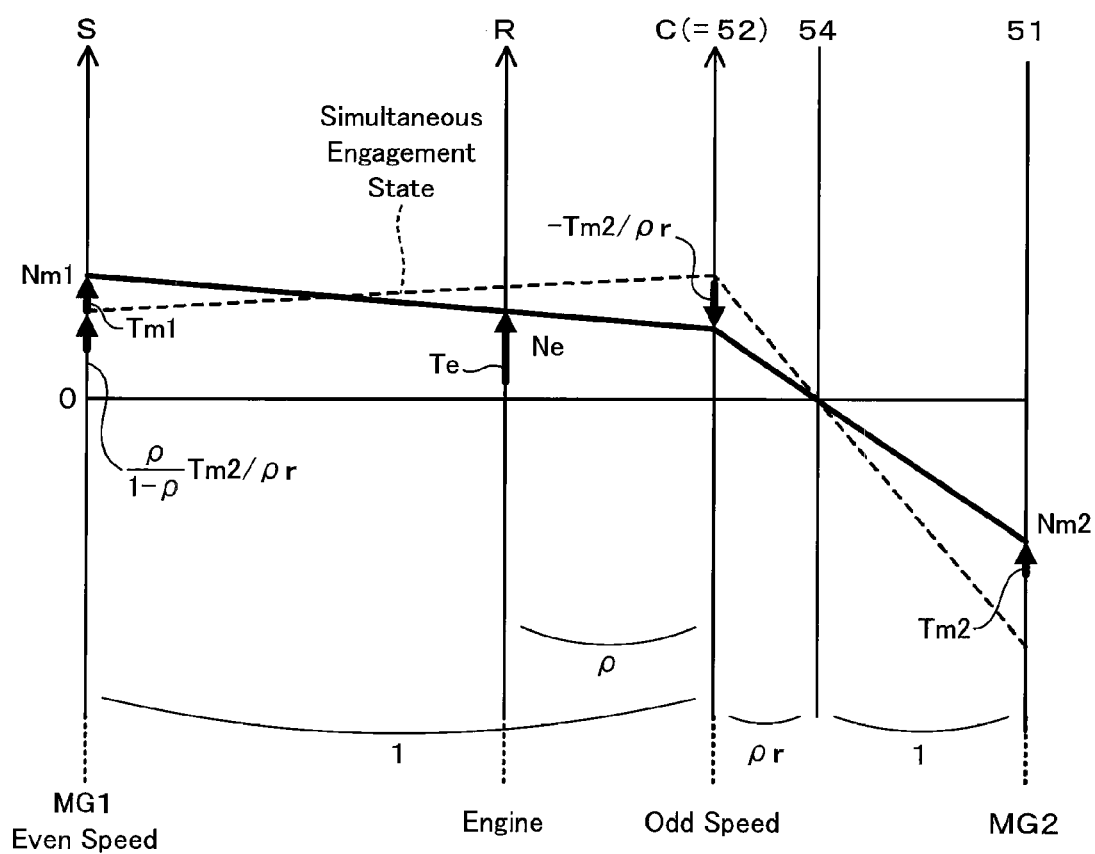
FIG. 10 is an alignment chart showing torque-rotation speed dynamics of the respective elements in the power distribution integration mechanism 40 and in the reduction gear mechanism 50 in a mode of making the motor MG2 function as a generator and the motor MG1 function as a motor.

In the $1^{st}$ speed-2nd speed simultaneous engagement state of FIG. 3, releasing the clutch C1 causes only the second gear 62a (second speed gear train) to be kept fixed to the first motor shaft 46 (sun gear 41) by means of the clutch C2, as shown by the two-dot chain line in FIG. 5. In this state, the motors MG1 and MG2 are driven and controlled to specify the sun gear 41 of the power distribution integration mechanism 40 to the output element and to cause the motor MG1 connecting with the sun gear 41 to function as a motor, while being driven and controlled to specify the carrier 45 of the power distribution integration mechanism 40 to the reactive force element and to cause the motor MG2 connecting with the carrier 45 to function as a generator. In the description hereafter, this mode of making the motor MG2 function as a generator and the motor MG1 function as a motor is referred to as 'second torque conversion mode'. The alignment chart of FIG. 10 shows torque-rotation speed dynamics of the respective elements in the power distribution integration mechanism 40 and in the reduction gear mechanism 50 in the second torque conversion mode. In the second torque conversion mode, the power of the engine 22 is subjected to torque conversion by the power distribution integration mechanism 40 and the motors MG1 and MG2 and is output to the sun gear 41. Controlling the rotation speed of the motor MG2 continuously and steplessly varies the ratio of the rotation speed of the engine 22 to the rotation speed of the sun gear 41 as the output element. The power output to the sun gear 41 (first motor shaft 46) is subjected to speed change (speed reduction) based on the speed ratio of the second speed gear train (second gears 62a and 62b) and is transmitted to the driveshaft 67. The symbols and numerals in the alignment chart of FIG. 10 represent the same as those in FIG. 2.

In response to an increase in vehicle speed V of the hybrid vehicle 20 in the state of FIG. 5, that is, in the second speed state with selection of the second speed gear train, as the rotation speed of the motor MG2 functioning as a generator gradually decreases, the rotation speed of the carrier shaft 45a becomes substantially equal to the rotation speed of the third gear 63a engaging with the mating third gear 63b on the countershaft 65. This allows a shift from the second speed state (with the second speed gear train) to the third speed state (with the third speed gear train). For a shift from the second speed state to the third speed state, while the clutch C2 keeps the second gear 62a (second speed gear train) fixed to the first motor shaft 46 (sun gear 41), the clutch C1 is coupled to fix the third gear 63a (third speed gear train) to the carrier shaft 45a (carrier 45) with setting 0 to the torque commands of the motors MG1 and MG2, as shown by the one-dot chain line and the two-dot chain line in FIG. 6. In this simultaneous engagement state, both the motors MG1 and MG2 idle without performing either the power operation or the regenerative operation. The output power (torque) of the engine 22 is then mechanically (directly) transmitted to the driveshaft 67 at a fixed (constant) speed ratio (a value between the speed ratio of the second speed gear train and the speed ratio of the third speed gear train), which is different from the fixed speed ratio in the $1^{st}$ speed-2nd speed simultaneous engagement state and from the fixed speed ratio in the $1^{st}$ speed fixation state, without conversion into electrical energy. The state of FIG. 6 is specifically referred to as '$2^{nd}$ speed-$3^{rd}$ speed simultaneous engagement state'.

Figure 6:
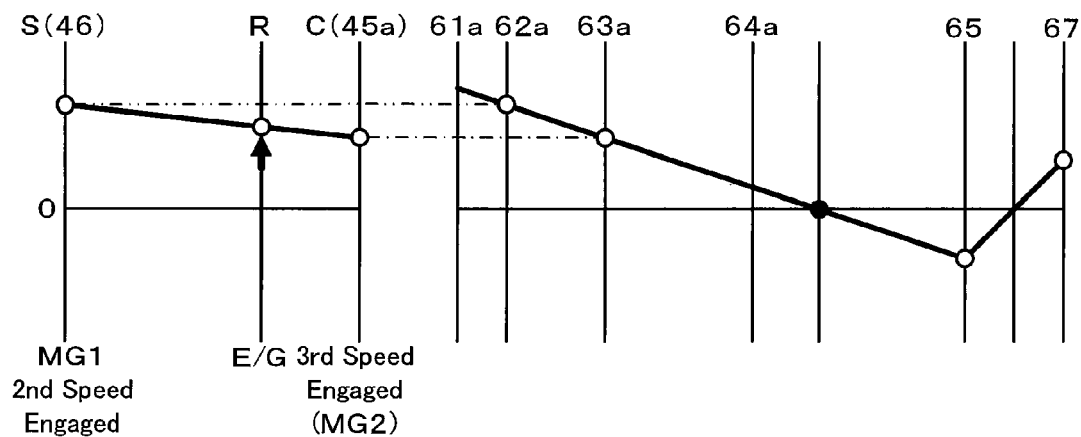
FIG. 6 is an explanatory view similar to FIG. 2.
Figure 7:
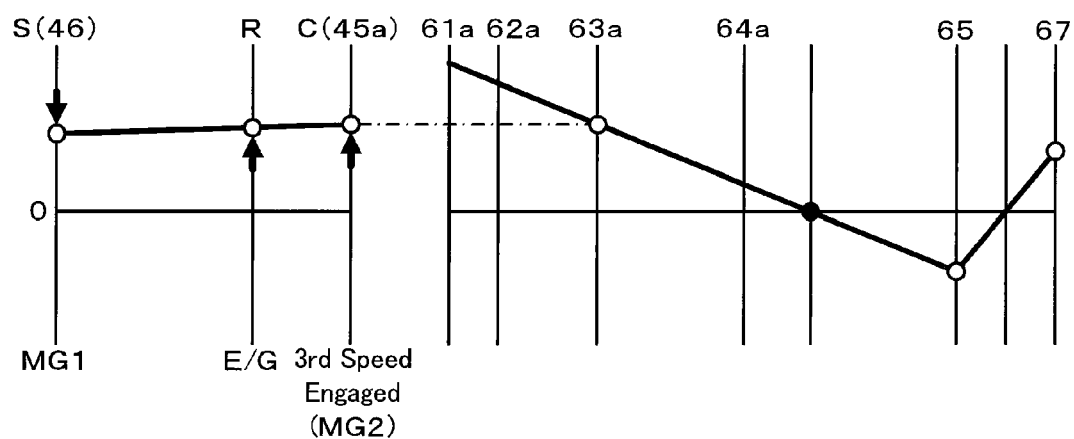
FIG. 7 is an explanatory view similar to FIG. 2.

In the $2^{nd}$ speed-$3^{rd}$ speed simultaneous engagement state of FIG. 6, releasing the clutch C2 causes only the third gear 63a (third speed gear train) to be kept fixed to the carrier shaft 45a (carrier 45) by means of the clutch C1, as shown by the one-dot chain line in FIG. 7. This leads to a shift to the first torque conversion mode again. In this state, the power output to the carrier 45 (carrier shaft 45a) is subjected to speed change based on the speed ratio (minimum speed ratio) of the third speed gear train (third gears 63a and 63b) and is transmitted to the driveshaft 67. In response to an increase in vehicle speed V of the hybrid vehicle 20 in the third speed state with selection of the third speed gear train, as the rotation speed of the motor MG1 functioning as a generator gradually decreases, the rotation speed of the first motor shaft 46 becomes substantially equal to the rotation speed of the interlocking gear 64a engaging the mating interlocking gear 64b on the countershaft 65. The synchronization of the rotation speed of the first motor shaft 46 with the rotation speed of the interlocking gear 64a engaging with the mating interlocking gear 64b on the countershaft 65 in the third speed state enables the clutch C2 to be coupled and fix the interlocking gear 64a (fixed speed ratio setting gear train) to the first motor shaft 46a (sun gear 41), while the clutch C1 keeps the third gear 63a (third speed gear train) fixed to the carrier shaft 45a (carrier 45), as shown by the one-dot chain line and the dotted line in FIG. 8. Setting 0 to the torque commands of the motors MG1 and MG2 in this state causes the motors MG1 and MG2 to idle without performing either the power operation or the regenerative operation. The output power (torque) of the engine 22 is then mechanically (directly) transmitted to the driveshaft 67 at a fixed (constant) speed ratio, which is different from the fixed speed ratio in the $1^{st}$ speed-$2^{nd}$ speed simultaneous engagement state, from the fixed speed ratio in the $1^{st}$ speed fixation state, and from the fixed speed ratio in the $2^{nd}$ speed-$3^{rd}$ speed simultaneous engagement state discussed above, without conversion into electrical energy. In the description hereafter, the mode of connecting the carrier 45 as the first element of the power distribution integration mechanism 40 to the driveshaft 67 via the third speed gear train having the minimum speed ratio and connecting the sun gear 41 as the second element to the driveshaft 67 via the fixed speed ratio setting gear train is also referred to as 'simultaneous engagement mode'. The state of FIG. 8 is specifically referred to as '$3^{rd}$ speed fixation state'. The series of operations described above is performed basically in a reverse flow for a downshift change of the speed ratio of the transmission 60.

Figure 11:
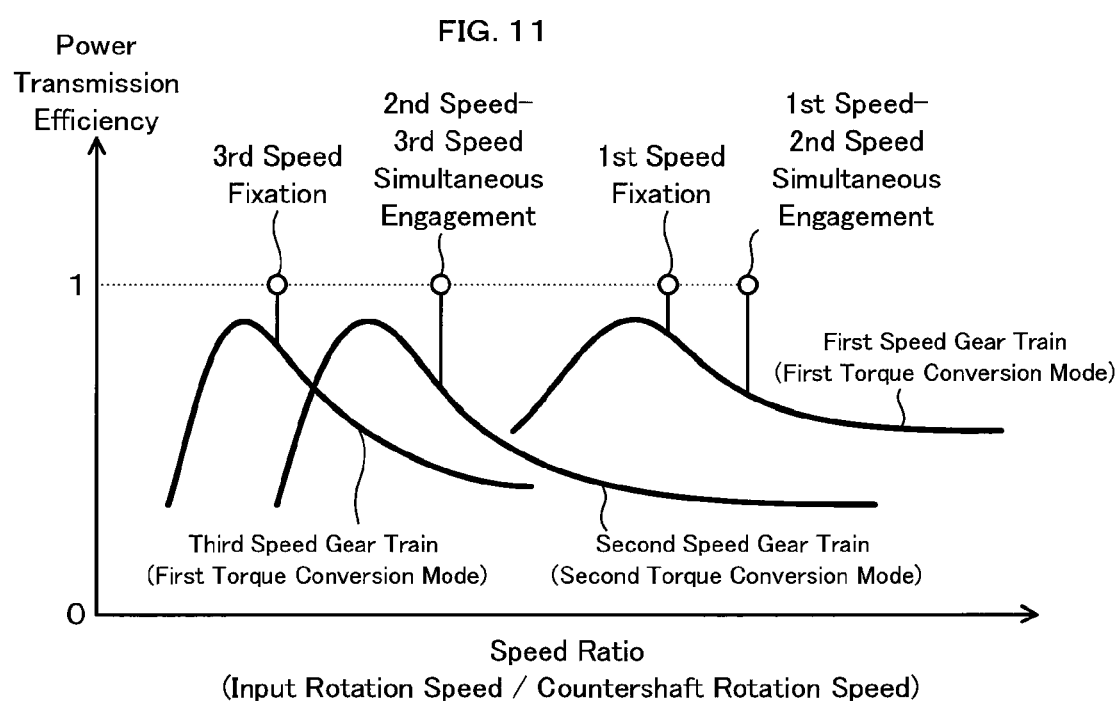
FIG. 11 shows relations of the power transmission efficiency against the speed ratio of the transmission 60 in the hybrid vehicle 20 of the first embodiment.

In the hybrid vehicle 20 of the embodiment, the torque conversion mode is alternately changed over between the first torque conversion mode and the second torque conversion mode with a change of the speed ratio of the transmission 60. Such alternate change of the torque conversion mode desirably prevents the rotation speed Nm1 or Nm2 of one motor MG1 or MG2 functioning as a generator from decreasing to a negative value with an increase of the rotation speed Nm2 or Nm1 of the other motor MG2 or MG1 functioning as a motor. The configuration of the hybrid vehicle 20 thus effectively prevents the occurrence of power circulation in the first torque conversion mode as well as the occurrence of power circulation in the second torque conversion mode, thus improving the power transmission efficiency in a wider driving range. The power circulation in the first torque conversion mode is that, in response to a decrease in rotation speed of the motor MG1 to a negative value, the motor MG2 consumes part of the power output to the carrier shaft 45a and generates electric power, while the motor MG1 consumes the electric power generated by the motor MG2 and outputs power. The power circulation in the second torque conversion mode is that, in response to a decrease in rotation speed of the motor MG2 to a negative value, the motor MG1 consumes part of the power output to the first motor shaft 46 and generates electric power, while the motor MG2 consumes the electric power generated by the motor MG1 and outputs power. Prevention of such power circulation restricts the maximum rotation speeds of the motors MG1 and MG2 and thereby allows size reduction of the motors MG1 and MG2. During a drive of the hybrid vehicle 20 in the simultaneous engagement mode, the output power of the engine 22 is mechanically (directly) transmitted to the driveshaft 67 at the fixed speed ratio intrinsic to each of the $1^{st}$ speed-$2^{nd}$ speed simultaneous engagement state, the $1^{st}$ speed fixation state, the $2^{nd}$ speed-$3^{rd}$ speed simultaneous engagement state, and the $3^{rd}$ speed fixation state. As shown in FIG. 11, this arrangement desirably increases the opportunity of mechanically (directly) outputting the power from the engine 22 to the driveshaft 67 without conversion into electrical energy, thus further improving the power transmission efficiency in the wider driving range. In the power output apparatus of a general configuration including an engine, two motors, and a power distribution integration mechanism such as a planetary gear mechanism, there is a greater fraction of the engine power converted into electrical energy at a relatively large speed reduction ratio between the engine and a driveshaft. This lowers the power transmission efficiency and tends to cause heat evolution from the motors MG1 and MG2. The simultaneous engagement mode discussed above is thus especially advantageous for the relatively large speed reduction ratio between the engine 22 and the driveshaft. In the hybrid vehicle 20 of the embodiment, the torque conversion mode is changed over between the first torque conversion mode and the second torque conversion mode via the simultaneous engagement mode at the time of a change of the speed ratio in the transmission 60. This arrangement effectively prevents a torque-off condition at the time of a change of the speed ratio and ensures a smooth and shockless change of the speed ratio, that is, a smooth and shockless changeover of the torque conversion mode between the first torque conversion mode and the second torque conversion mode.

Figure 12:
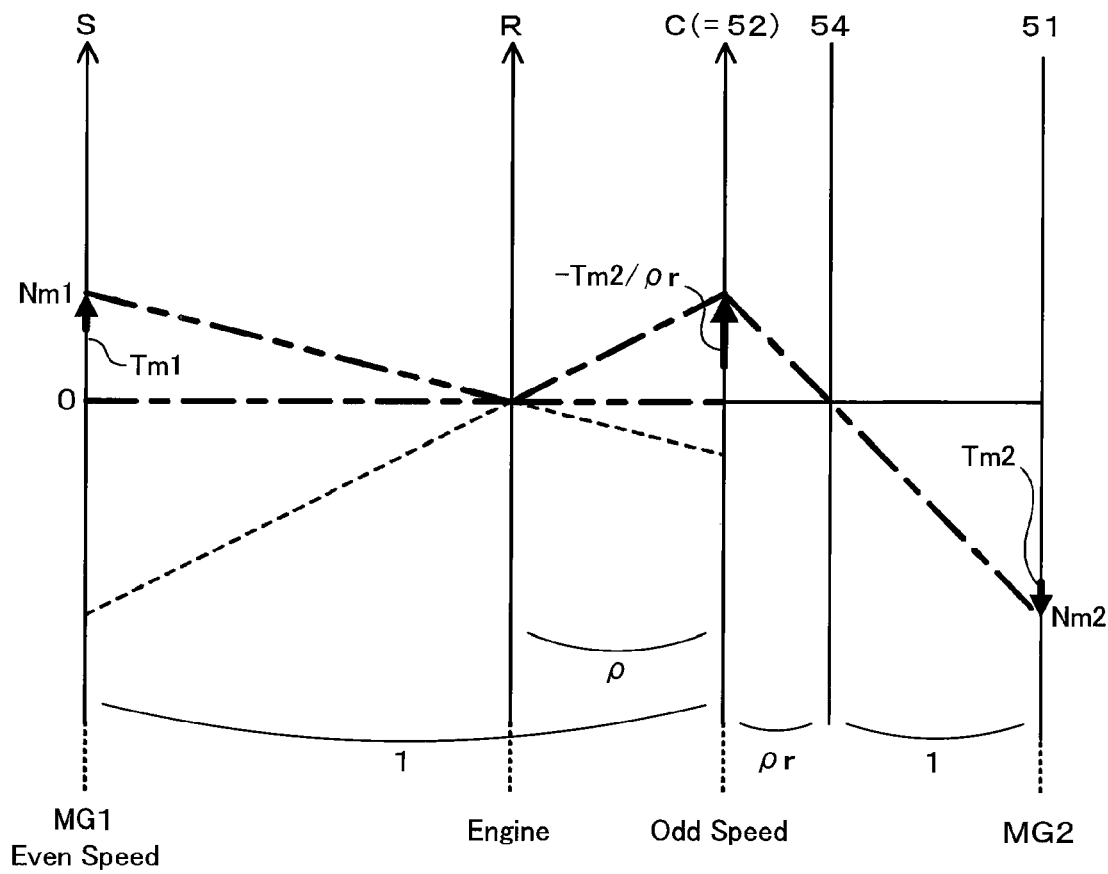
FIG. 12 is an explanatory view for explaining a motor drive mode in the hybrid vehicle 20 of the first embodiment.

The motor drive mode is described below with reference to FIG. 12. When the hybrid vehicle 20 is driven in the motor drive mode, at least one of the motors MG1 and MG2 consumes the electric power discharged from the battery 35 and outputs power, with the operation of the engine 22 stopped. The hybrid vehicle 20 of the embodiment has multiple different types of the motor drive mode, a first motor drive mode of causing only the motor MG2 to output power, a second motor drive mode of causing only the motor MG1 to output power, and a third motor drive mode of causing both the motors MG1 and MG2 to output power. In the first motor drive mode, for example, only the motor MG2 is driven and controlled with fixation of the first gear 61a of the first speed gear train or the third gear 63a of the third speed gear train to the carrier shaft 45a by means of the clutch C1 in combination with release of the clutch C0 and the clutch C2 of the transmission 60. In this state, the power is output from the motor MG2 to the carrier 45 as shown by the one-dot chain line in FIG. 12. This output power is then transmitted to the driveshaft 67 via the first speed gear train or the third speed gear train. The release of the clutch C0 of disconnecting the sun gear 41 from the first motor shaft 46 causes the function of the power distribution integration mechanism 40 to prevent the follow-up of the crankshaft 26 of the engine 22 at stop, while the release of the clutch C2 prevents the follow-up of the motor MG1 (see the one-dot chain line in FIG. 12). Such prevention of the follow-up effectively reduces a decrease of the power transmission efficiency. In the second motor drive mode, for example, only the motor MG1 is driven and controlled with fixation of the second gear 62a of the second speed gear train to the first motor shaft 46 by means of the clutch C2 in combination with release of the clutch C0 and the clutch C1 of the transmission 60. In this state, the power is output from the motor MG1 to the sun gear 41 as shown by the two-dot chain line in FIG. 12. The output power is then transmitted to the driveshaft 67 via the sun gear shaft 41a, the first motor shaft 46, and the second speed gear train. The release of the clutch C0 of disconnecting the sun gear 41 from the first motor shaft 46 causes the function of the power distribution integration mechanism 40 to prevent the follow-up of the crankshaft 26 of the engine 22 at stop, while the release of the clutch C1 prevents the follow-up of the motor MG2 (see the one-dot chain line or the two-dot chain line in FIG. 12). Such prevention of the follow-up effectively reduces a decrease of the power transmission efficiency. In the third motor drive mode, both the motors MG1 and MG2 are driven and controlled with setting the transmission 60 in one of the $1^{st}$ speed-$2^{nd}$ speed simultaneous engagement state, the $1^{st}$ speed fixation state, the $2^{nd}$ speed-$3^{rd}$ speed simultaneous engagement state, and the $3^{rd}$ speed fixation state by the release and the coupling of the clutches C1 and C2. In this state, the power is output from both the motors MG1 and MG2, so that a large power is transmitted to the driveshaft 67 in the motor drive mode. This arrangement desirably ensures the good toeing capacity in the motor drive mode. In the first motor drive mode or in the second motor drive mode, one motor MG1 or MG2 may be controlled to output power with following up the other motor MG2 or MG1 at stop in the coupled condition of the clutch C0 (see the broken line in FIG. 12).

In the hybrid vehicle 20 of the embodiment, the mode change of the motor drive among the first motor drive mode to the third motor drive mode enables the power to be transmitted to the driveshaft 67 with high efficiency with a change of the speed ratio in the transmission 60. In the first motor drive mode where only the motor MG2 is driven and controlled in combination with fixation of the first gear 61a of the first speed gear train to the carrier shaft 45a by means of the clutch C1, in the case of an upshift change of the speed ratio in the transmission 60, the rotation speed of the motor MG1 is synchronized first with the rotation speed of the second gear 62a of the second speed gear train. The subsequent fixation of the second gear 62a to the first motor shaft 46 by means of the clutch C2 makes a shift to the third motor drive mode or more specifically to the $1^{st}$ speed-$2^{nd}$ speed simultaneous engagement state. The subsequent release of the clutch C1, in combination with the second gear 62a of the second speed gear train kept fixed to the first motor shaft 46 by means of the clutch C2, makes a shift to the second motor drive mode where only the motor MG1 is driven and controlled. This causes the speed ratio of the transmission 60 to be changed to an upshift speed (second speed). In the second motor drive mode where only the motor MG1 is driven and controlled in combination with fixation of the second gear 62a of the second speed gear train to the first motor shaft 46 by means of the clutch C2, in the case of an upshift change of the speed ratio in the transmission 60, the rotation speed of the motor MG2 is synchronized first with the rotation speed of the third gear 63a of the third speed gear train. The subsequent fixation of the third gear 63a to the carrier shaft 45a by means of the clutch C1 makes a shift to the third motor drive mode or more specifically to the $2^{nd}$ speed-$3^{rd}$ speed simultaneous engagement state. The subsequent release of the clutch C2, in combination with the third gear 63a of the third speed gear train kept fixed to the carrier shaft 45a by means of the clutch C1, makes a shift to the first motor drive mode where only the motor MG2 is driven and controlled. This causes the speed ratio of the transmission 60 to be changed to an upshift speed (third speed). In the hybrid vehicle 20 of the embodiment, the transmission 60 is used to reduce the rotation speed of either the carrier shaft 45a or the first motor shaft 46 and thereby amplify the torque even in the motor drive mode. This arrangement desirably decreases the maximum torques required for the motors MG1 and MG2 and thereby allows size reduction of the motors MG1 and MG2. The mode change of the motor drive transits through the third motor drive mode, that is, the simultaneous engagement mode, at the time of a change of the speed ratio in the transmission 60. This arrangement effectively prevents a torque-off condition at the time of a change of the speed ratio and ensures a smooth and shockless change of the speed ratio.

The series of operations described above is performed basically in a reverse flow for a downshift change of the speed ratio of the transmission 60 in the motor drive mode. In the first motor drive mode where only the motor MG2 is driven and controlled to output power or in the second motor drive mode where only the motor MG1 is driven and controlled to output power, in response to an increase in driving force demand or in response to a decrease in state of charge SOC of the battery 35, the other motor MG1 or MG2 of currently outputting no power is driven and controlled to make the rotation speed Nm1 or the rotation speed Nm2 synchronous with the rotation speed of the sun gear 41 or the rotation speed of the carrier 45 in the power distribution integration mechanism 40. After the synchronization of the rotation speed, the clutch C0 is coupled, and the other motor MG1 or MG2 is controlled to motor and start the engine 22. This arrangement allows a start of the engine 22 with smooth power transmission to the driveshaft 67. On a start of the engine 22 in the third motor drive mode where both the motors MG1 and MG2 are driven and controlled to output power, a power transmission-conversion process is performed. The power transmission-conversion process selects one motor MG1 or MG2 as a motor of continuously outputting power according to the target speed ratio of the transmission 60 and causes the power of the other motor MG2 or MG1 as a motor of not continuously outputting power to be output to the selected one motor MG1 or MG2. On completion of the power transmission-conversion process, the clutch C2 or C1 is released to separate the other motor MG2 or MG1 as the motor of not continuously outputting power from the transmission 60. The separated other motor MG2 or MG1 is then driven and controlled to make the rotation speed Nm2 or the rotation speed Nm1 synchronous with the rotation speed of the carrier 45 or the rotation speed of the sun gear 41 in the power distribution integration mechanism 40. After the synchronization of the rotation speed, the clutch C0 is coupled, and the other motor MG2 or MG1 is controlled to motor and start the engine 22. This arrangement allows a start of the engine 22 with smooth power transmission to the driveshaft 67. In the first motor drive mode or in the second motor drive mode, when one motor MG1 or MG2 is controlled to output power with following up the other motor MG2 or MG1 at stop in the coupled condition of the clutch C0, the engine 22 is motored to start by the other motor MG2 or MG1 at stop.

As described above, the hybrid vehicle 20 of the embodiment is equipped with the transmission 60 including the first speed change mechanism and the second speed change mechanism. The first speed change mechanism is constructed as the power transmission mechanism to connect the carrier 45 as the first element of the power distribution integration mechanism 40 to the driveshaft 67 and to transmit the power from the carrier 45 to the driveshaft 67 at the speed ratio of the first speed gear train or at the speed ratio of the third speed gear train. The second speed change mechanism works to connect the sun gear 41 as the second element of the power distribution integration mechanism 40 to the driveshaft 67 and to transmit the power from the sun gear 41 to the driveshaft 67 at the speed ratio of the second speed gear train. The second speed change mechanism of the transmission 60 has the fixed speed ratio setting gear train (interlocking gears 64a and 64b) that connects the sun gear 41 as the second element of the power transmission integration mechanism 40 to the driveshaft 67 and enables the power from the engine 22 to be transmitted to the driveshaft 67 at the fixed or constant speed ratio in the state of connection of the carrier 45 to the driveshaft 67 by the first speed change mechanism. In the hybrid vehicle 20 of the embodiment, connecting the power distribution integration mechanism 40 with the driveshaft 67 by either one of the first speed change mechanism and the second speed change mechanism of the transmission 60 enables the power from the carrier 45 or from the sun gear 41 of the power distribution integration mechanism 40 to be transmitted to the driveshaft 67 at the speed ratio of the first speed change mechanism (either the first speed gear train or the third speed gear train) or at the speed ratio of the second speed change mechanism (the second speed gear train). In the state of connection of the carrier 45 of the power distribution integration mechanism 40 to the driveshaft 67 by the first speed change mechanism as the power transmission mechanism, connecting the sun gear 41 of the power distribution integration mechanism 40 to the driveshaft 67 by the fixed speed ratio setting gear train enables the output power of the engine 22 to be mechanically (directly) transmitted to the driveshaft 67 at the fixed speed ratio in either the $1^{st}$ speed fixation state or the $3^{rd}$ speed fixation state without conversion into electrical energy. The hybrid vehicle 20 of this arrangement ensures the improved power transmission efficiency in the wider driving range.

As described above, the transmission 60 of the embodiment is the parallel shaft-type transmission constructed to have the first speed change mechanism including the first speed gear train and the third speed gear train as the parallel shaft-type gear trains and the second speed change mechanism including the second speed gear train as the parallel shaft-type gear train. The second speed change mechanism also includes the fixed speed ratio setting gear train (interlocking gears 64a and 64b) as the parallel shaft-type gear train that is not used alone to set the speed ratio. Since the fixed speed ratio setting gear train is not used alone to set the speed ratio, the gear ratio of the interlocking gears 64a and 64b may be set arbitrarily, for example, set to an extremely small value as in the embodiment. This allows arbitrary setting of the fixed speed ratio in the $1^{st}$ speed fixation state or in the $3^{rd}$ speed fixation state as clearly understood from FIG. 11.

The transmission 60 mounted on the hybrid vehicle 20 of the embodiment is designed to selectively transmit the output power via the carrier 45 (carrier shaft 45a) as the first element of the power distribution integration mechanism 40 or the output power via the sun gear 41 (first motor shaft 46) as the second element to the driveshaft 67 and to change the speed ratios between the first motor shaft 46 and the driveshaft 67 and between the carrier shaft 45a and the driveshaft 67. The hybrid vehicle 20 effectively prevents the power circulation by the changeover between the first torque conversion mode and the second torque conversion mode as discussed above, thus improving the power transmission efficiency in the wide driving range. During a drive of the hybrid vehicle 20 in the simultaneous engagement mode, such as the $1^{st}$ speed-$2^{nd}$ speed simultaneous engagement state or the $2^{nd}$ speed-$3^{rd}$ speed simultaneous engagement state, the output power of the engine 22 is mechanically (directly) transmitted to the driveshaft 67 at the fixed speed ratio that is different from the fixed speed ratios in the $1^{st}$ speed fixation state and in the $3^{rd}$ speed fixation state. This arrangement desirably increases the opportunity of mechanically (directly) outputting the power from the engine 22 to the driveshaft 67 without conversion into electrical energy, thus further improving the power transmission efficiency in the wider driving range. The hybrid vehicle 20 of the above configuration accordingly has both the high fuel consumption and the good driving performance.

The hybrid vehicle 20 of the embodiment has the clutch C0 to connect and disconnect the sun gear shaft 41a with and from the first motor shaft 46, that is, to connect and disconnect the sun gear 41 with and from the motor MG1. When the clutch C0 is released to disconnect the sun gear shaft 41a from the first motor shaft 46, the function of the power distribution integration mechanism 40 causes the engine 22 to be substantially separated from the motors MG1 and MG2 and the transmission 60. In the released condition of the clutch C0 with the operation of the engine 22 stopped in the hybrid vehicle 20, the power from at least one of the motors MG1 and MG2 is transmitted to the driveshaft 67 with high efficiency with a change of the speed ratio in the transmission 60. Such configuration of the hybrid vehicle 20 desirably decreases the maximum torques required for the motors MG1 and MG2 and thereby allows size reduction of the motors MG1 and MG2. The clutch C0 is not restricted to the structure of connecting and disconnecting the sun gear 41 with and from the motor MG1. The clutch C0 may be structured to connect and disconnect the carrier 45 (first element) with and from the carrier shaft 45a (motor MG2) or may be structured to connect and disconnect the crankshaft 26 of the engine 22 with and from the ring gear 42 (third element).

Figure 13:
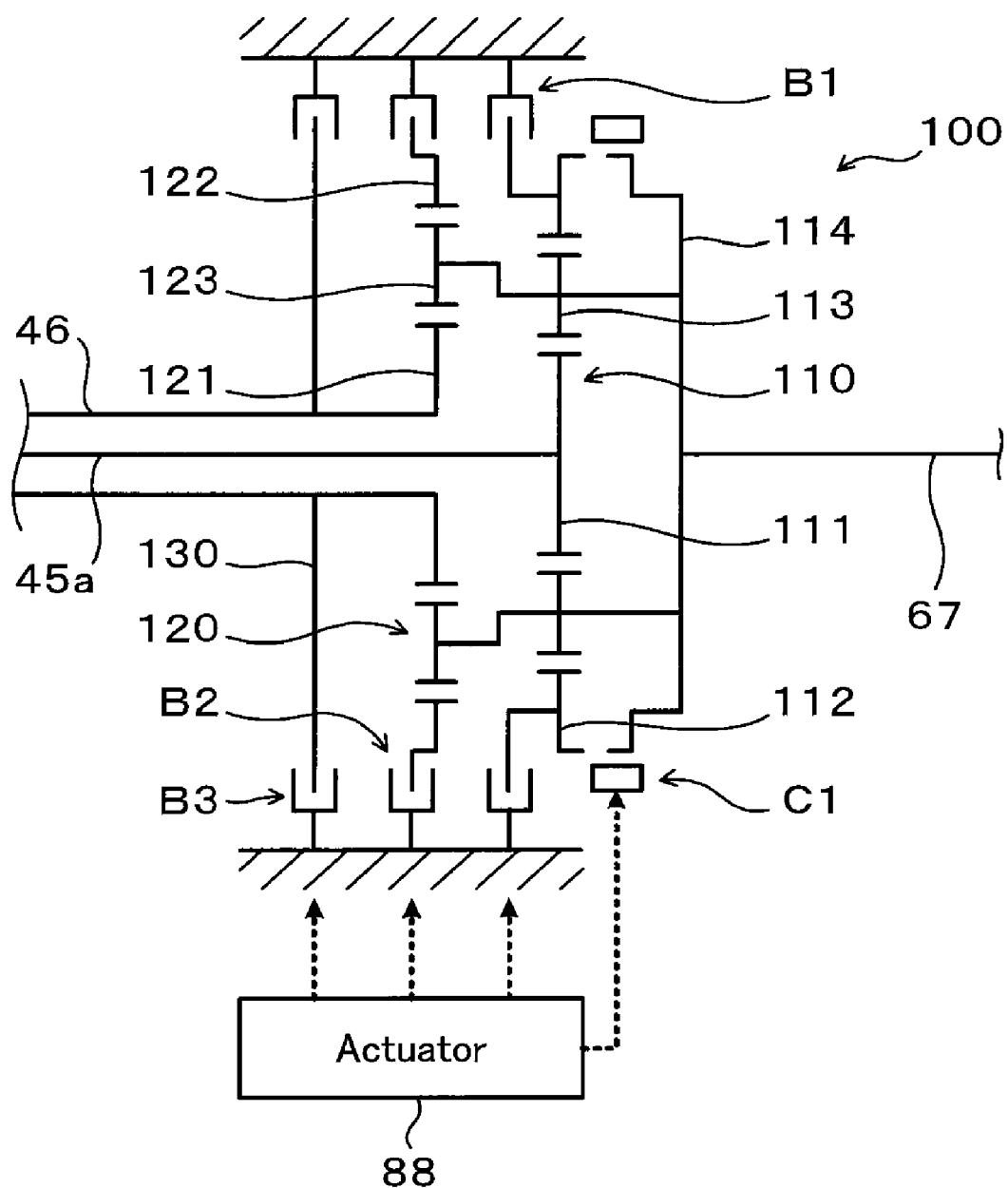
FIG. 13 schematically shows the structure of another transmission 100 applicable to the hybrid vehicle 20 of the first embodiment.

A planetary gear-type transmission 100 shown in FIG. 13 may be adopted, in place of the parallel shaft-type transmission 60, for the hybrid vehicle 20 of the embodiment. The transmission 100 shown in FIG. 13 is designed to have a speed ratio selectively changeable among multiple different values. The transmission 100 includes a first change-speed planetary gear mechanism 110, a second change-speed planetary gear mechanism 120, a brake B1 (first fixation mechanism) provided for the first change-speed planetary gear mechanism 110, a brake B2 (second fixation mechanism) provided for the second change-speed planetary gear mechanism 120, a brake B3 (rotation fixation mechanism), and a clutch C1 (change-speed connecting-disconnecting mechanism). The first change-speed planetary gear mechanism 110 is connected via the carrier shaft 45a to the carrier 45 as the first element of the power distribution integration mechanism 40. The second change-speed planetary gear mechanism 120 is connected to the first motor shaft 46 that is connectable via the clutch C0 with the sun gear 41 as the second element of the power distribution integration mechanism 40. The first change-speed planetary gear mechanism 110 and the brake B1 constitute a first speed change mechanism of the transmission 100, and the second change-speed planetary gear mechanism 120 and the brake B2 constitute a second speed change mechanism of the transmission 100. As shown in FIG. 13, the first change-speed planetary gear mechanism 110 is constructed as a single-pinion planetary gear mechanism including a sun gear 111 connected with the carrier shaft 45a, a ring gear 112 as an internal gear arranged concentrically with the sun gear 111, and a carrier 114 arranged to hold multiple pinion gears 113 engaging with both the sun gear 111 and the ring gear 112 and connected with the driveshaft 67. The first change-speed planetary gear mechanism 110 has the sun gear 111 (input element), the ring gear 112 (fixable element), and the carrier 114 (output element) as elements of differential rotation. The second change-speed planetary gear mechanism 120 is constructed as a single-pinion planetary gear mechanism including a sun gear 121 connected with the first motor shaft 46, a ring gear 122 as an internal gear arranged concentrically with the sun gear 121, and the common carrier 114 shared by the first change-speed planetary gear mechanism 110 and arranged to hold multiple pinion gears 123 engaging with both the sun gear 121 and the ring gear 122. The second change-speed planetary gear mechanism 120 has the sun gear 121 (input element), the ring gear 122 (fixable element), and the carrier 114 (output element) as elements of differential rotation. In the structure of the embodiment, the second change-speed planetary gear mechanism 120 is arranged coaxially with and located ahead of the first change-speed planetary gear mechanism 110 in the vehicle body. The second change-speed planetary gear mechanism 120 has a slightly greater gear ratio ρ2 (the number of teeth of the sun gear 121/the number of teeth of the ring gear 122) than a gear ratio ρ1 (the number of teeth of the sun gear 111/the number of teeth of the ring gear 112) of the first change-speed planetary gear mechanism 110. The brake B1 fixes the ring gear 112 of the first change-speed planetary gear mechanism 110 to the transmission casing to prohibit the rotation of the ring gear 112, while releasing the fixation of the ring gear 112 to allow the rotation of the ring gear 112. The brake B1 is actuated by the electric, electromagnetic, or hydraulic actuator 88. The brake B2 fixes the ring gear 122 of the second change-speed planetary gear mechanism 120 to the transmission casing to prohibit the rotation of the ring gear 122, while releasing the fixation of the ring gear 122 to allow the rotation of the ring gear 122. The brake B2 is actuated by the actuator 88, like the brake B1. The brake B3 fixes the first motor shaft 46 or the sun gear 41 as the second element of the power distribution integration mechanism 40 to the transmission casing via a stator 130 fixed to the first motor shaft 46 to prohibit the rotation of the first motor shaft 46, while releasing the fixation of the stator 130 to allow the rotation of the first motor shaft 46. The brake B3 is actuated by the actuator 88, like the brakes B1 and B2. The clutch C1 connects and disconnects the carrier 114 as the output element with and from the ring gear 112 as the fixable element of the first change-speed planetary gear mechanism 110. The clutch C1 is actuated by the actuator 88, like the brakes B1 through B3. The clutch C1 is structured, for example, as a dog clutch to make a dog element fastened to the carrier 114 engage with a dog element fastened to the ring gear 112 with little loss and to release the engagement. The power transmitted from the carrier 114 of the transmission 100 to the driveshaft 67 is eventually output to the rear wheels 69a and 69b as the drive wheels via the differential gear 68.

The transmission 100 of this modified configuration significantly reduces the dimensions both in the axial direction and in the radial direction, compared with the parallel shaft-type transmission. The first change-speed planetary gear mechanism 110 and the second change-speed planetary gear mechanism 120 are located in the downstream of and are arranged coaxially with the engine 22, the motors MG1 and MG2, and the power distribution integration mechanism 40. The transmission 100 of this modified arrangement desirably simplifies the bearing structure and reduces the required number of bearings. The transmission 100 has the speed ratio selectively changeable among the multiple different values as discussed below. Fixation of the ring gear 112 of the first change-speed planetary gear mechanism 110 to the transmission casing in the non-rotatable manner by means of the brake B1 causes the power from the carrier shaft 45a to be subjected to speed change at a speed ratio of ($\rho 1/(1+\rho 1)$) based on the gear ratio $\rho 1$ of the first change-speed planetary gear mechanism 110 and to be transmitted to the driveshaft 67 (hereafter this state is referred to as 'first speed state ($1^{st}$ speed)'). Fixation of the ring gear 122 of the second change-speed planetary gear mechanism 120 to the transmission casing in the non-rotatable manner by means of the brake B2 causes the power from the first motor shaft 46 to be subjected to speed change at a speed ratio of ($\rho 2/(1+\rho 2)$) based on the gear ratio p2 of the second change-speed planetary gear mechanism 120 and to be transmitted to the driveshaft 67 (hereafter this state is referred to as 'second speed state ($2^{nd}$ speed)'). The connection of the carrier 114 with the ring gear 112 in the first change-speed planetary gear mechanism 110 by means of the clutch C1 substantially integrates the sun gear 111, the ring gear 112, and the carrier 114 as the constituents of the first change-speed planetary gear mechanism 110 and thereby causes the power from the carrier shaft 45a to be transmitted to the driveshaft 67 at a speed ratio of 1 (hereafter this state is referred to as 'third speed state ($3^{rd}$ speed)'.

In the first speed state with fixation of the ring gear 112 as the fixable element by the brake B1 (first fixation mechanism) and connection of the carrier 45 of the power distribution integration mechanism 40 with the driveshaft 67 by the first change-speed planetary gear mechanism 110 (first speed change mechanism), fixation of the ring gear 122 as the fixable element by the brake B2 as the second fixation mechanism included in the second speed change mechanism leads to the fixation of both the ring gears 112 and 122 as the fixable elements of the first and the second change-speed planetary gear mechanisms 110 and 120 in the non-rotatable manner by means of the brakes B1 and B2. The output power of the engine 22 is thus mechanically (directly) transmitted to the driveshaft 67 at a fixed speed ratio (hereafter this state is referred to as '$1^{st}$ speed-$2^{nd}$ speed simultaneous engagement state'). In this state, the first change-speed planetary gear mechanism 110 (first speed change mechanism) and the brake B2 of the second speed change mechanism respectively function as the power transmission mechanism and as the fixed speed ratio setting mechanism. Non-rotatable fixation of the ring gear 122 of the second change-speed planetary gear mechanism 120, which does not respond to the clutch C1 as the change-speed connecting-disconnecting mechanism, causes the second change-speed planetary gear mechanism 120 to function as the power transmission mechanism. In the second speed state with non-rotatable fixation of the ring gear 122 of the second change-speed planetary gear mechanism 120, which does not respond to the clutch C1, connection of the carrier 114 as the output element with the ring gear 112 as the fixable element in the first change-speed planetary gear mechanism 110, which responds to the clutch C1, by means of the clutch C1 causes the clutch C1 to function as the fixed speed ratio setting mechanism. The output power of the engine 22 is thus mechanically (directly) transmitted to the driveshaft 67 at a fixed speed ratio that is different from the fixed speed ratio in the $1^{st}$ speed-$2^{nd}$ speed simultaneous engagement state (this state is hereafter referred to as '$2^{nd}$ speed-$3^{rd}$ speed simultaneous engagement state'). In the third speed state with connection of the carrier 114 with the ring gear 112 of the first change-speed planetary gear mechanism 110 by the clutch C1, non-rotatable fixation of the first motor shaft 46 or the sun gear 41 as the second element of the power distribution integration mechanism 40 to the transmission casing via the stator 130 fastened to the first motor shaft 46 by the brake B3 as the rotation fixation mechanism causes the output power of the engine 22 to be mechanically (directly) transmitted to the driveshaft 67 at a fixed speed ratio that is different from the fixed speed ratios in the $1^{st}$ speed-$2^{nd}$ speed simultaneous engagement state and in the $2^{nd}$ speed-$3^{rd}$ speed simultaneous engagement state (this state is hereafter referred to as '$3^{rd}$ speed fixation state'). In the first speed state with fixation of the ring gear 112 by the brake B1 and connection of the carrier 45 of the power distribution integration mechanism 40 with the driveshaft 67 by the first change-speed planetary gear mechanism 110, non-rotatable fixation of the first motor shaft 46 or the sun gear 41 as the second element of the power distribution integration mechanism 40 to the transmission casing via the stator 130 fastened to the first motor shaft 46 by the brake B3 as the rotation fixation mechanism causes the output power of the engine 22 to be mechanically (directly) transmitted to the driveshaft 67 at a fixed speed ratio that is different from the fixed speed ratios in the $1^{st}$ speed-$2^{nd}$ speed simultaneous engagement state, in the $2^{nd}$ speed-$3^{rd}$ speed simultaneous engagement state, and in the $3^{rd}$ speed fixation state (this state is hereafter referred to as '$1^{st}$ speed fixation state'). The planetary gear-type transmission 100 has the similar functions and effects to those of the parallel shaft-type transmission 60 discussed previously.

Figure 14:
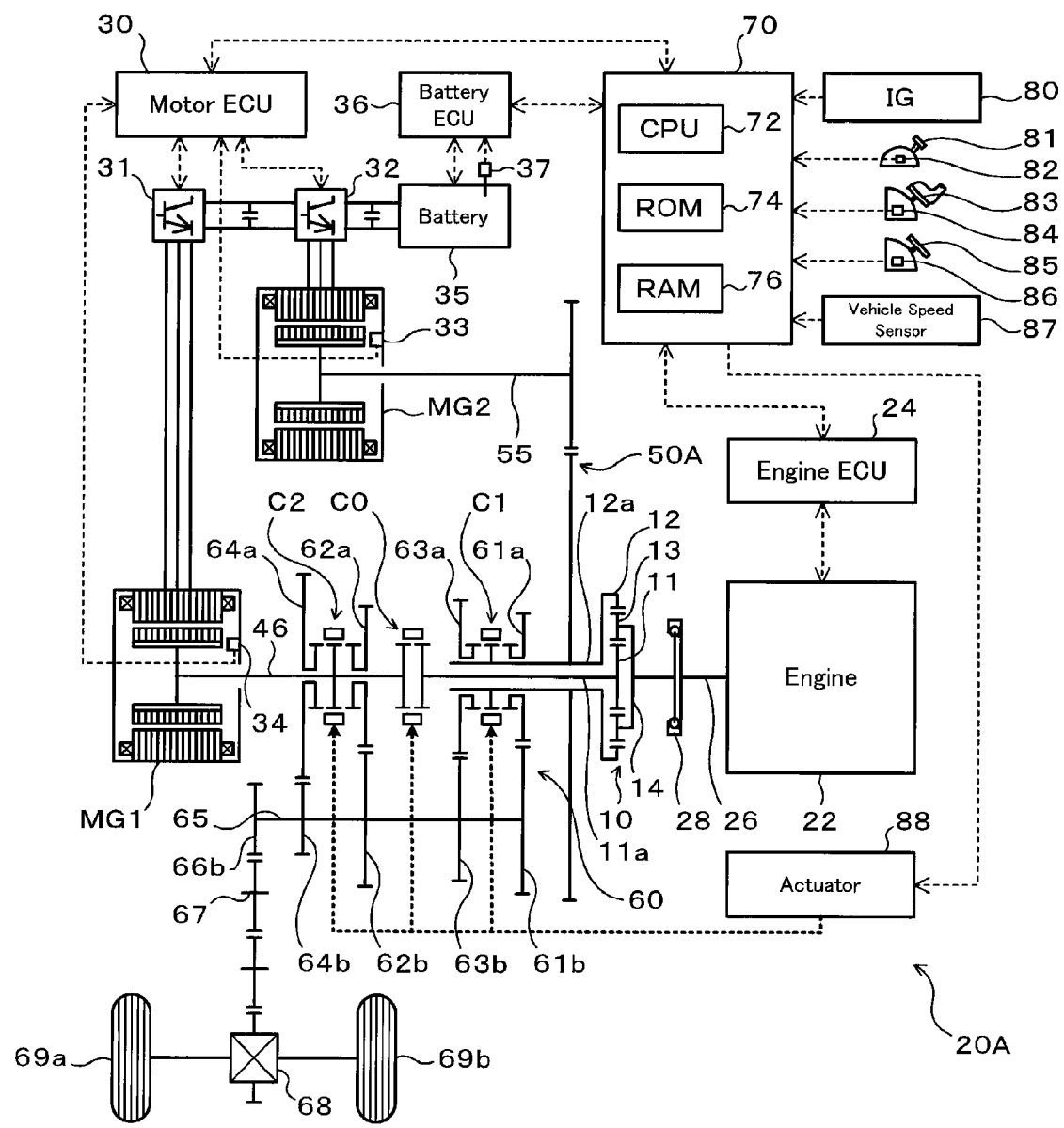
FIG. 14 schematically illustrates the configuration of a hybrid vehicle 20A in one modified example.

FIG. 14 schematically illustrates the configuration of a hybrid vehicle 20A as one modified example of the embodiment. While the hybrid vehicle 20 of the embodiment is configured as a rear wheel-drive vehicle, the hybrid vehicle 20A of the modified example is configured as a front wheel-drive vehicle. As shown in FIG. 14, the hybrid vehicle 20A has a power distribution integration mechanism 10 constructed as a single-pinion planetary gear mechanism including a sun gear 11, a ring gear 12 arranged concentrically with the sun gear 11, and a carrier 14 arranged to hold multiple pinion gears 13 engaging with both the sun gear 11 and the ring gear 12. The engine 22 is horizontally arranged, and the crankshaft 26 of the engine 22 is connected with the carrier 14 as a third element of the power distribution integration mechanism 10. The ring gear 12 as a first element of the power distribution integration mechanism 10 is connected with a hollow ring gear shaft 12a, which is linked to the motor MG2 via a reduction gear mechanism 50A as a parallel shaft-type gear train and the second motor shaft 55 extended in parallel with the first motor shaft 46. Either the first speed gear train (gear 61a) or the third speed gear train (gear 63a) in the first speed change mechanism of the transmission 60 is selectively fixed to the ring gear shaft 12a by means of the clutch C1. The sun gear 11 as a second element of the power distribution integration mechanism 10 is connected with a sun gear shaft 11a. The sun gear shaft 11a passes through the hollow ring gear shaft 12a to be linked to the clutch C0 and is connectable with the first motor shaft 46 or the motor MG1 by means of the clutch C0. Either the second speed gear train (gear 62a) or the fixed speed ratio setting gear train (interlocking gear 64a) in the second speed change mechanism of the transmission 60 is selectively fixed to the first motor shaft 46 by means of the clutch C2. As discussed above, the hybrid vehicle of the embodiment may be configured as the front-wheel drive vehicle.

Figure 15:
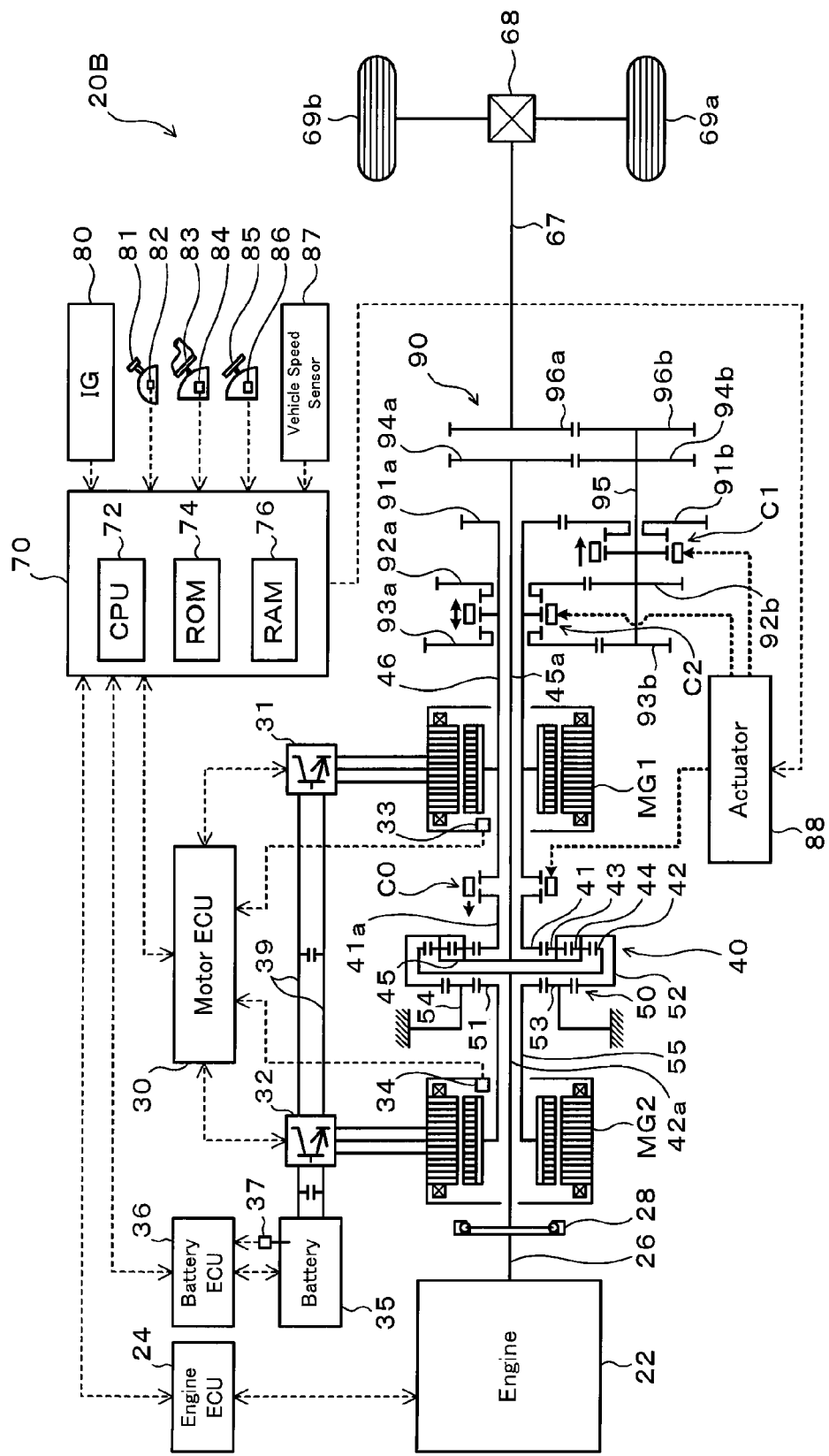
FIG. 15 schematically illustrates the configuration of a hybrid vehicle 20B in a second embodiment of the invention.

The following describes a hybrid vehicle 20B in a second embodiment of the invention. FIG. 15 schematically illustrates the configuration of the hybrid vehicle 20B of the second embodiment. The hybrid vehicle 20B of the second embodiment is a rear-wheel drive vehicle having the hardware configuration basically similar to that of the hybrid vehicle 20 of the first embodiment with some exception. In order to avoid the duplicated explanation, the like hardware components in the hybrid vehicle 20B of the second embodiment to those in the hybrid vehicle 20 of the first embodiment are expressed by the like numerals and symbols and are not specifically described here. The hybrid vehicle 20B of the second embodiment has a transmission 90 that is different from the transmission 60 mounted on the hybrid vehicle 20 of the first embodiment. The transmission 90 has a first drive gear 91a and a first driven gear 91b forming a first fixed speed ratio setting gear train, a second drive gear 92a and a second driven gear forming a second fixed speed ratio setting gear train, a third drive gear 93a and a third driven gear 93b forming a third fixed speed ratio setting gear train, a transmission gear 94a and a mating transmission gear 94b forming a transmission gear train as a power transmission mechanism, a countershaft 95 with the respective driven gears 91b to 93b, the transmission gear 94b, and a gear 96b fixed thereon, clutches C1 and C2, a gear 96a attached to the driveshaft 67, and a reverse gear train (not shown). In the structure of the transmission 90, the first fixed speed ratio setting gear train has a largest gear ratio (number of teeth of the driven gear/number of teeth of the drive gear), and the gear ratio decreases with a shift to the second fixed speed ratio setting gear train and further to the third fixed speed ratio setting gear train.

As shown in FIG. 15, the transmission gear 94a of the transmission gear train is fastened on one end of the carrier shaft 45a extended from the carrier 45 as the first element of the power distribution integration mechanism 40 and continuously engages with the mating transmission gear 94b fastened on the countershaft 95. The first drive gear 91a of the first fixed speed ratio setting gear train is fastened on one end of the first motor shaft 46, which is connectable to the sun gear 41 as the second element of the power distribution integration mechanism 40 via the clutch C0, and continuously engages with the mating first driven gear 91b held on the countershaft 95 in a rotatable but axially unmovable manner. In the structure of this second embodiment, the clutch C1 is provided on the side of the countershaft 95 to fix the second driven gear 92b (first fixed speed ratio setting gear train) to the countershaft 95 and to release the first driven gear 91b from the countershaft 95 and make the first driven gear 91b rotatable relative to the countershaft 95. The clutch C1 may be structure, for example, as a dog clutch. The second drive gear 92a of the second fixed speed ratio setting gear train and the third drive gear 93a of the third fixed speed ratio setting gear train are supported on the first motor shaft 46 in a rotatable but axially unmovable manner and continuously engages with the mating second driven gear 92b and with the mating third driven gear 93b fixed on the countershaft 95, respectively. In the structure of the second embodiment, the clutch C2 is provided on the side of the first motor shaft 46 to selectively fix one of the first drive gear 91a (first fixed speed ratio setting gear train) and the third drive gear 93a (third fixed speed ratio setting gear train) to the first motor shaft 46 and to release the first drive gear 91a and the third drive gear 93a from the carrier shaft 45a and make the first drive gear 91a and the third drive gear 93a rotatable relative to the carrier shaft 45a. Like the clutch C1, the clutch C2 may be structured, for example, as a dog clutch. In the structure of this embodiment, providing the clutch C1 on the side of the countershaft 95 and the clutch C2 on the side of the first motor shaft 46 enables the gear with a lower rotation speed between each pair of gears constituting each of the first to the third fixed speed ratio setting gear trains to be linked to the corresponding shaft, thus effectively reducing the potential loss in linkage.

Figure 16:
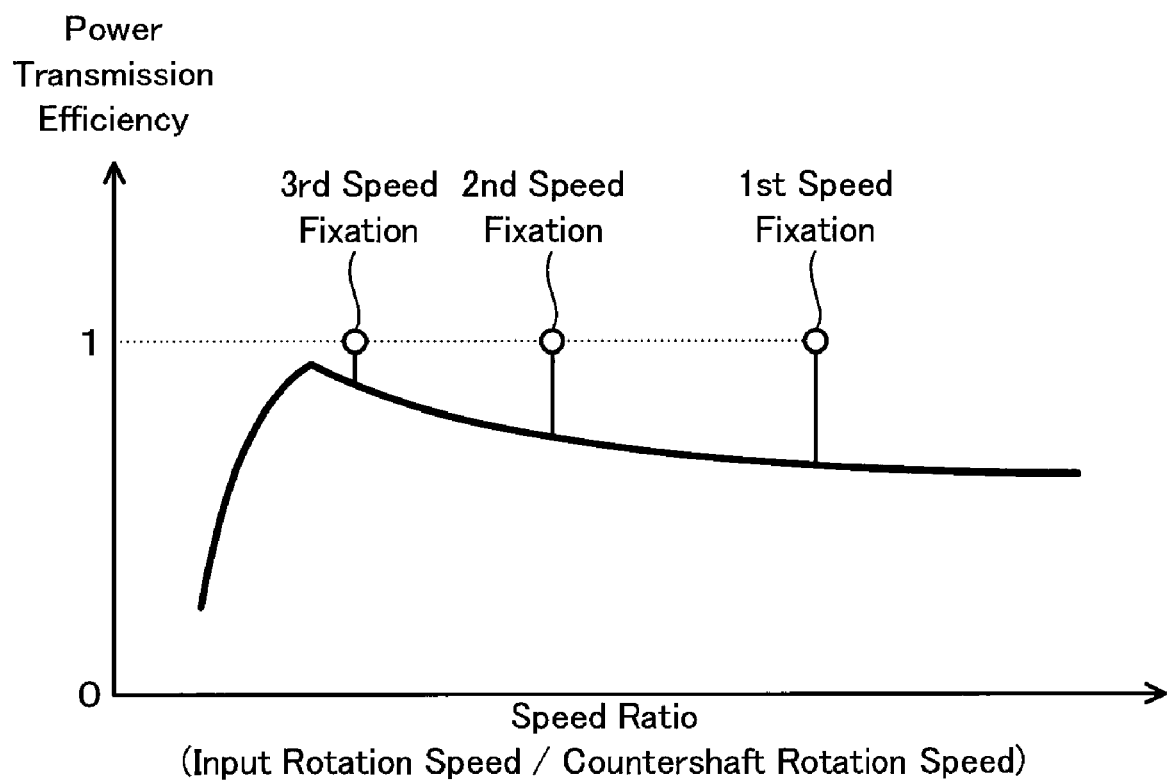
FIG. 16 shows a relation of the power transmission efficiency against the speed ratio of a transmission 90 in the hybrid vehicle 20 of the second embodiment.
Figure 17:
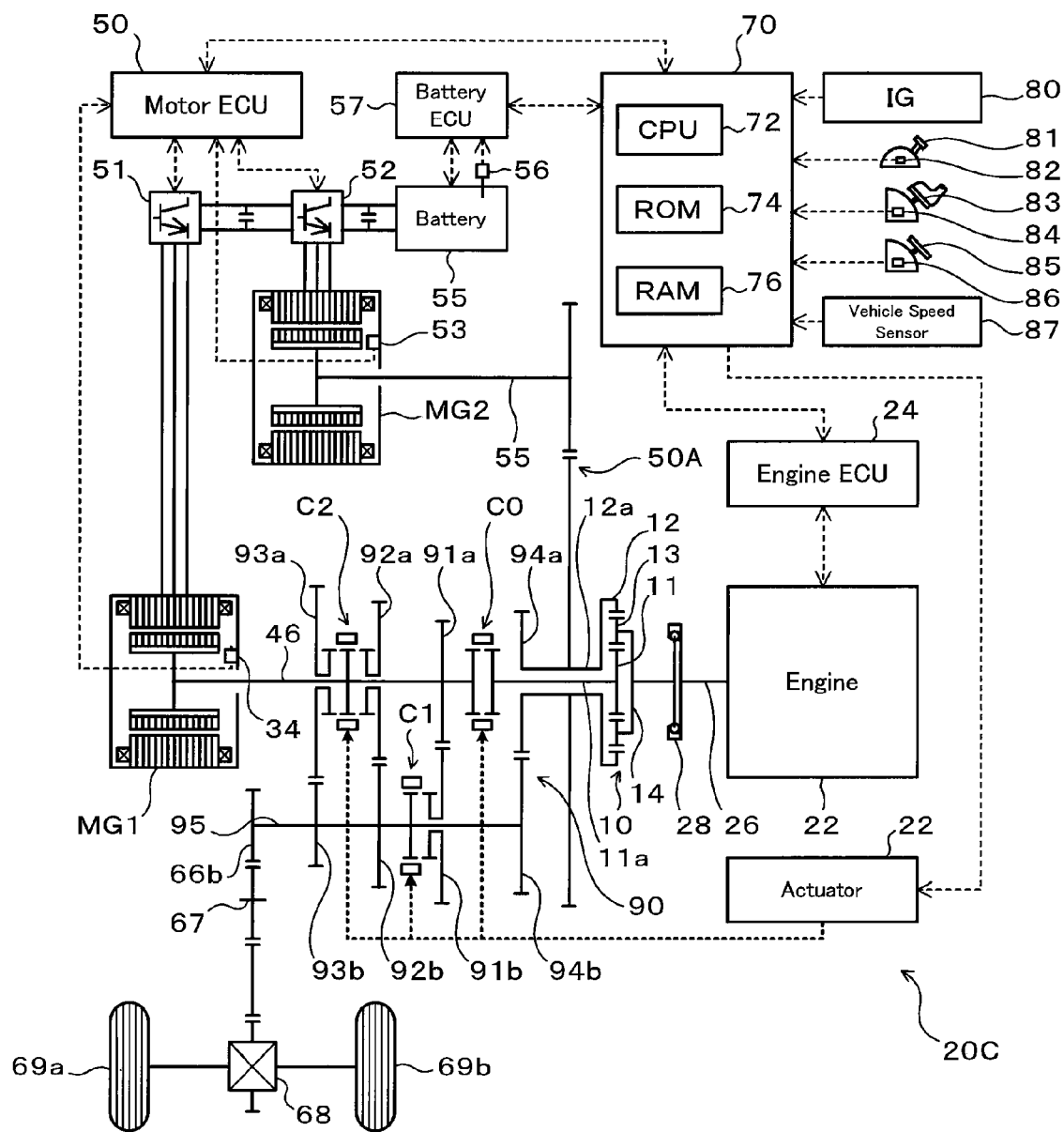
FIG. 17 schematically illustrates the configuration of a hybrid vehicle 20C in another modified example.

In the hybrid vehicle 20B of the second embodiment equipped with the transmission 90 of the above configuration, the carrier 45 as the first element of the power distribution integration mechanism 40 is continuously linked to the driveshaft 67 by means of the transmission gear train (transmission gears 94a and 94b) as the power transmission mechanism included in the transmission 90. The hybrid vehicle 20B is thus basically (except a motor drive time) driven in the first torque conversion mode where the motor MG2 connecting with the carrier 45 as the output element functions as a motor and the motor MG1 connecting with the sun gear 41 as the reactive force element functions as a generator. During a drive of the hybrid vehicle 20B, when the rotation speed of the first driven gear 91b engaging with the mating first drive gear 91a fastened on the first motor shaft 46 (motor MG1) becomes substantially equal to the rotation speed of the countershaft 95, the clutch C1 is coupled to fix the first driven gear 91b (first fixed speed ratio setting gear train) to the countershaft 95 with setting 0 to the torque commands of the motors MG1 and MG2. The output power (torque) of the engine 22 is then mechanically (directly) transmitted to the driveshaft 67 at a fixed speed ratio without conversion into electrical energy (this state is referred to as '$1^{st}$ speed fixation state'). During a drive of the hybrid vehicle 20B, when the rotation speed of the second drive gear 92a engaging with the mating second driven gear 92b fastened on the countershaft 95 becomes substantially equal to the rotation speed of the first motor shaft 46 (motor MG1), the clutch C2 is coupled to fix the second drive gear 92a (second fixed speed ratio setting gear train) to the first motor shaft 46 with setting 0 to the torque commands of the motors MG1 and MG2. The output power (torque) of the engine 22 is then mechanically (directly) transmitted to the driveshaft 67 at a smaller fixed speed ratio than the fixed speed ratio in the $1^{st}$ speed fixation state without conversion into electrical energy (this state is referred to as '$2^{nd}$ speed fixation state'). During a drive of the hybrid vehicle 20B, when the rotation speed of the third drive gear 93a engaging with the mating third driven gear 93b fastened on the countershaft 95 becomes substantially equal to the rotation speed of the first motor shaft 46 (motor MG1), the clutch C2 is coupled to fix the third drive gear 93a (third fixed speed ratio setting gear train) to the first motor shaft 46 with setting 0 to the torque commands of the motors MG1 and MG2. The output power (torque) of the engine 22 is then mechanically (directly) transmitted to the driveshaft 67 at a smaller fixed speed ratio than the fixed speed ratio in the $2^{nd}$ speed fixation state without conversion into electrical energy (this state is referred to as '$3^{rd}$ speed fixation state'). As discussed above, in the structure of this embodiment, the transmission gear train included in the transmission 90 as the power transmission mechanism continuously links the carrier 45 as the first element of the power distribution integration mechanism 40 to the driveshaft 67. The first to the third fixed speed ratio setting gear trains included in the transmission 90 work to selectively set the fixed speed ratio among multiple different values and thereby allow mechanical (direct) transmission of the output power of the engine 22 to the driveshaft 67 at the different values of the fixed speed ratio as shown in FIG. 16. This arrangement ensures the improved power transmission efficiency in the wider driving range. The configuration of the transmission 90 is not restrictively applied to the rear-wheel drive vehicle as in the hybrid vehicle 20B of the second embodiment explained above but is also applicable to a front-wheel drive vehicle as in a hybrid vehicle 20C of a modified example shown in FIG. 17.

The embodiment and its modified examples discussed above are to be considered in all aspects as illustrative and not restrictive. There may be many other modifications, changes, and alterations without departing from the scope or spirit of the main characteristics of the present invention.

The power distribution integration mechanism provided in the hybrid vehicle 20 or in the hybrid vehicle 20B discussed above may be constructed as a planetary gear mechanism including a first sun gear and a second sun gear having different numbers of teeth and at least one stepped gear of a first pinion gear engaging with the first sun gear in linkage with a second pinion gear engaging with the second sun gear. The power distribution integration mechanism provided in the hybrid vehicle 20 or in the hybrid vehicle 20B discussed above may be constructed as a single-pinion planetary gear mechanism including a sun gear, a ring gear, and a carrier arranged to hold at least one pinion gear engaging with both the sun gear and the ring gear. Any of the hybrid vehicles 20, 20A, 20B, and 20C of the embodiments and their modified examples discussed above may be constructed as a rear-wheel drive-based four-wheel drive vehicle or a front-wheel drive-based four-wheel drive vehicle. In the above embodiments, each of the clutch C0 and the clutches C1 and C2 in the transmission 60 or 90 is constructed as the mechanical dot clutch having little loss. Each of the clutches C0 to C2 may alternatively be constructed as a wet multiplate clutch. The above embodiments and their modified examples describe the power output apparatuses mounted on the hybrid vehicle 20. The power output apparatus of the invention is, however, not restrictively applied to such hybrid vehicles but may be mounted on diversity of moving bodies including various vehicles other than motor vehicles, boats and ships, and aircraft or may be built in stationary equipment, such as construction machinery.

Industrial Applicability

The technique of the invention is preferably applied to the manufacturing industries of power output apparatuses and hybrid vehicles.

The invention claimed is:

1. A power output apparatus configured to output power to a driveshaft, the power output apparatus comprising:
    an internal combustion engine;
    a first motor designed to input and output power;
    a second motor designed to input and output power;
    a power distribution integration mechanism constructed to have a first element connecting with a rotating shaft of the first motor, a second element connecting with a rotating shaft of the second motor, and a third element connecting with an engine shaft of the internal combustion engine and to allow differential rotations of the three elements; and
    a speed change-transmission assembly including: a power transmission mechanism configured to connect one of the first element and the second element of the power distribution integration mechanism with the driveshaft and to transmit power from the connected one of the first element and the second element to the driveshaft at a preset speed ratio; and a fixed speed ratio setting mechanism configured to, when one of the first element and the second element is connected with the driveshaft by the power transmission mechanism, connect the other of the first element and the second element with the driveshaft and to transmit power from the internal combustion engine to the driveshaft at a constant or fixed speed ratio,
    wherein the speed change-transmission assembly is a parallel shaft-type transmission including: a first speed change mechanism having at least one parallel shaft-type gear train arranged to connect one of the first element and the second element of the power distribution integration mechanism with the driveshaft; and a second speed change mechanism having at least one parallel shaft-type gear train arranged to connect the other of the first element and the second element with the driveshaft, wherein the power transmission mechanism is equivalent to one of the first speed change mechanism and the second speed change mechanism, and wherein the fixed speed ratio setting mechanism is a parallel shaft-type gear train that is included in the other of the first speed change mechanism and the second speed change mechanism and is not used alone to set a speed ratio.

2. A power output apparatus configured to output power to a driveshaft, the power output apparatus comprising:
    an internal combustion engine;
    a first motor designed to input and output power;
    a second motor designed to input and output power;
    a power distribution integration mechanism constructed to have a first element connecting with a rotating shaft of the first motor, a second element connecting with a rotating shaft of the second motor, and a third element connecting with an engine shaft of the internal combustion engine and to allow differential rotations of the three elements; and
    a speed change-transmission assembly including: a power transmission mechanism configured to connect one of the first element and the second element of the power distribution integration mechanism with the driveshaft and to transmit power from the connected one of the first element and the second element to the driveshaft at a preset speed ratio; and a fixed speed ratio setting mechanism configured to, when one of the first element and the second element is connected with the driveshaft by the power transmission mechanism, connect the other of the first element and the second element with the driveshaft and to transmit power from the internal combustion engine to the driveshaft at a constant or fixed speed ratio, wherein the power transmission mechanism of the speed change-transmission assembly continuously connects one of the first element and the second element with the driveshaft.

3. The power output apparatus in accordance with claim 2, wherein the fixed speed ratio setting mechanism is configured to selectively set the fixed speed ratio among multiple different values.

4. The power output apparatus in accordance with claim 3, wherein the fixed speed ratio setting mechanism includes multiple parallel shaft-type gear trains that have mutually different gear ratios and are selectively used to connect the other of the first element and the second element with the driveshaft.

5. A hybrid vehicle equipped with drive wheels driven with power transmitted from a driveshaft, the hybrid vehicle comprising:
an internal combustion engine;
a first motor designed to input and output power;
a second motor designed to input and output power;
a power distribution integration mechanism constructed to have a first element connecting with a rotating shaft of the first motor, a second element connecting with a rotating shaft of the second motor, and a third element connecting with an engine shaft of the internal combustion engine and to allow differential rotations of the three elements; and
a speed change-transmission assembly including: a power transmission mechanism configured to connect one of the first element and the second element of the power distribution integration mechanism with the driveshaft and to transmit power from the connected one of the first element and the second element to the driveshaft at a preset speed ratio; and a fixed speed ratio setting mechanism configured to, when one of the first element and the second element is connected with the driveshaft by the power transmission mechanism, connect the other of the first element and the second element with the driveshaft and to transmit power from the internal combustion engine to the driveshaft at a constant or fixed speed ratio, wherein the speed change-transmission assembly is a parallel shaft-type transmission including: a first speed change mechanism having at least one parallel shaft-type gear train arranged to connect one of the first element and the second element of the power distribution integration mechanism with the driveshaft; and a second speed change mechanism having at least one parallel shaft-type gear train arranged to connect the other of the first element and the second element with the driveshaft, wherein the power transmission mechanism is equivalent to one of the first speed change mechanism and the second speed change mechanism, and wherein the fixed speed ratio setting mechanism is a parallel shaft-type gear train that is included in the other of the first speed change mechanism and the second speed change mechanism and is not used alone to set a speed ratio.

6. A hybrid vehicle equipped with drive wheels driven with power transmitted from a driveshaft, the hybrid vehicle comprising:
an internal combustion engine;
a first motor designed to input and output power;
a second motor designed to input and output power;
a power distribution integration mechanism constructed to have a first element connecting with a rotating shaft of the first motor, a second element connecting with a rotating shaft of the second motor, and a third element connecting with an engine shaft of the internal combustion engine and to allow differential rotations of the three elements; and
a speed change-transmission assembly including: a power transmission mechanism configured to connect one of the first element and the second element of the power distribution integration mechanism with the driveshaft and to transmit power from the connected one of the first element and the second element to the driveshaft at a preset speed ratio; and a fixed speed ratio setting mechanism configured to, when one of the first element and the second element is connected with the driveshaft by the power transmission mechanism, connect the other of the first element and the second element with the driveshaft and to transmit power from the internal combustion engine to the driveshaft at a constant or fixed speed ratio, wherein the power transmission mechanism of the speed change-transmission assembly continuously connects one of the first element and the second element with the driveshaft.

7. The hybrid vehicle in accordance with claim 6, wherein the fixed speed ratio setting mechanism is configured to selectively set the fixed speed ratio among multiple different values.

* * * * *